US009019895B2

(12) United States Patent
Li et al.

(10) Patent No.: US 9,019,895 B2
(45) Date of Patent: Apr. 28, 2015

(54) METHODS AND APPARATUS FOR CONTROLLING ACCESS POINTS COUPLED TO A COMMON POWER SOURCE

(71) Applicant: QUALCOMM Incorporated, San Diego, CA (US)

(72) Inventors: Junyi Li, Chester, NJ (US); Vincent D. Park, Budd Lake, NJ (US); Jin-Der Wang, Dublin, CA (US)

(73) Assignee: QUALCOMM Incorporated, San Diego, CA (US)

( * ) Notice: Subject to any disclaimer, the term of this patent is extended or adjusted under 35 U.S.C. 154(b) by 318 days.

(21) Appl. No.: 13/737,828

(22) Filed: Jan. 9, 2013

(65) Prior Publication Data

US 2014/0192712 A1 Jul. 10, 2014

(51) Int. Cl.
 *H04W 4/00* (2009.01)
 *H04W 52/02* (2009.01)
 *H04W 52/34* (2009.01)
 *H04W 52/14* (2009.01)
 *H04W 52/40* (2009.01)

(52) U.S. Cl.
 CPC ........ *H04W 52/0206* (2013.01); *H04W 52/143* (2013.01); *H04W 52/346* (2013.01); *H04W 52/40* (2013.01)

(58) Field of Classification Search
 None
 See application file for complete search history.

(56) References Cited

U.S. PATENT DOCUMENTS

| 6,085,106 | A | 7/2000 | Sendonaris et al. |
| 8,023,444 | B2 | 9/2011 | Bowser et al. |
| 2001/0055283 | A1* | 12/2001 | Beach ............................ 370/328 |
| 2004/0165550 | A1* | 8/2004 | Beach et al. ................... 370/328 |
| 2005/0281230 | A1* | 12/2005 | Beale ............................. 370/335 |

(Continued)

FOREIGN PATENT DOCUMENTS

| CN | 102448152 A | 5/2012 |
| EP | 2362697 A1 | 8/2011 |

(Continued)

OTHER PUBLICATIONS

Jardosh, A.P., et al., "Green WLANs: On-Demand WLAN Infrastructures," Mobile Networks and Applications (2009), pp. 798-814.

(Continued)

*Primary Examiner* — Dang Ton
*Assistant Examiner* — Ronald H Davis
(74) *Attorney, Agent, or Firm* — James K. O'Hare

(57) ABSTRACT

Power efficient methods and apparatus for detecting wireless terminals in a relatively small geographic area are described. Wireless terminals transmit discovery signals and/or other signals which may be detected by an access point. Various described methods and apparatus are well suited for embodiments where multiple access points, which obtain power from a common power source and/or via a common power bus, with limited power delivery capability. To address power constraints, access points are controlled by a gateway device coupled to the access points so that one or more access points perform monitoring at different times with one or more access points having their receivers powered off while another access point monitors for wireless terminal signals. Power consumption from the common power source is managed by controlling power consumption associated with monitoring operations performed by one or more access points coupled to a common power source.

20 Claims, 17 Drawing Sheets

(56) References Cited

U.S. PATENT DOCUMENTS

2009/0280854 A1    11/2009  Khan et al.
2010/0002614 A1     1/2010  Subrahmanya
2012/0046026 A1*    2/2012  Chande et al. ............. 455/422.1
2012/0224569 A1*    9/2012  Kubota ........................ 370/338
2013/0028605 A1*    1/2013  Beach ............................ 398/79
2014/0016478 A1*    1/2014  Koskela et al. ............... 370/241
2014/0119359 A1*    5/2014  Horneman et al. ........... 370/338

FOREIGN PATENT DOCUMENTS

EP          2448339 A1    5/2012
WO       2012037999 A1    3/2012

OTHER PUBLICATIONS

International Search Report and Written Opinion—PCT/US2014/010853—ISA/EPO—Mar. 10, 2014.

* cited by examiner

METHODS AND APPARATUS FOR CONTROLLING ACCESS POINTS COUPLED TO A COMMON POWER SOURCE

FIELD

Various embodiments relate to communications and, more particularly, to methods and apparatus for efficiently detecting wireless terminals and/or controlling access points in a communications system, e.g., a system in which the access points obtain power from a common power source.

BACKGROUND

In some indoor communications systems, it is common for multiple access points to be powered by a common power source with limited power delivery capabilities due to power source limitations and/or limitations of the wiring delivering the power, e.g., a common DC power source with a DC power bus with limited power delivery capabilities. An Ethernet+ Power over Ethernet (PoE) bus is an example of a network communications bus which also serves as a common power supply bus. As some wireless access points, e.g., base stations, have become relatively inexpensive, it can be desirable to populate a room with a large number of limited range inexpensive access points to provide a more complete coverage area, increase potential traffic, and/or reduce interference. For example, it may be desirable to connect multiple wireless access points to an existing Ethernet+PoE bus. Such an approach is particularly attractive for retrofitting conference rooms, halls, etc. which may have an Ethernet+PoE bus already prewired. Unfortunately, a large number of access points operating at the same time drawing power from the common bus may overload the bus. In some potential system deployments, there may be more access points in a system than wireless terminals, e.g., mobile nodes, in a particular room at a given point in time. In a communications system wherein the access points are powered by a common power source via a common power bus with limited power delivery capabilities, there is an upper boundary on the number of access points which can be operated similarly concurrently due to power constraints on the common power source and/or common power bus.

While having a large number of access points is desirable so that users can receive wireless signals regardless of their location in an area, when a large number of access points are in an area, use of a subset of access points may be sufficient if the access points are carefully selected at a given point in time.

From the above, it should be appreciated that there is a need for methods and apparatus that would allow a subset of access points to be powered at a given time from a common power source to be able to receive and/or send wireless signals, with the access points being powered being selected to provide adequate wireless signal coverage to user devices in the area being serviced by access points which are powered by the common power source. It is desirable if at least some methods and apparatus could be provided which avoided the need for access points to signal a controller to request power and/or the right to communicate since such access point requests can result in delays with regard to access points powering on and/or can lead to congestion and wasteful control signaling.

In view of the above, it should be appreciated that there is a need for new and improved methods of controlling power allocation to access points, which are powered from a common power source and/or share a common power bus and/or for controlling when one or more power consuming functions are performed by access points coupled to a common power bus.

From the above, it should be appreciated that there is a need for methods and apparatus that would allow a subset of access points to be powered at a given time from a common power source to receive and/or send wireless signals, with the access points being powered being selected to provide adequate wireless signal coverage to user devices in the area being served by access points coupled to the common bus.

SUMMARY

Various aspects and/or features of some, but not necessarily all, embodiments are discussed below. Power efficient methods and apparatus for detecting wireless terminals and/ or determining which of a plurality of access points in a relatively small geographic area, e.g., a room, should serve as a wireless terminal's point of network connectivity are described. In various embodiments wireless terminals transmit discovery signals and/or other signals which may be detected by an access point. Various described methods and apparatus are particularly well suited for embodiments where multiple access points obtain power from a common power source. The number of access points in a given area, e.g., room or group of rooms, may and in some embodiments does, exceed the number of access points which can be concurrently fully powered by the common power source, e.g., due to power supply and/or power delivery limitations of the network. Wireless terminals and the access points may use communications signals, e.g., blue tooth and/or other signals which are normally used for relatively short range communications and which may be subject to interference or blocking, e.g., due to an object in a room or an individual moving into a particular location in a room. While a room or group of rooms may have multiple ports, e.g., each powering an access point, the common power source and/or power delivery infrastructure may not, and in some embodiments cannot, power all the access points coupled to it at the same time with enough power to allow then to monitor and/or receive signals at the same time.

To address power constraints, the access points are controlled by a gateway device coupled to the access points so that one or more access points perform monitoring at different times with one or more access points having their receivers powered off while another access point monitors for wireless terminal signals and, at least in some embodiments, also refrains from transmitting. Thus, power consumption from the common power source is controlled by controlling power consumption associated with monitoring operations performed by one or more access points, which obtain power from the common power source.

Through the control of the number of access points performing monitoring operations at a given time, power consumption from the common power source is managed allowing the number of access points in an area to be higher than the number which could be supported due to limited power constraints if all the access points monitored for wireless terminals at the same time.

In some embodiments, the gateway may schedule access points in different areas to monitor at the same time thereby allowing a wide area to be initially monitored and wireless terminals to be detected quickly. In response to detection of a wireless terminal, a detecting access point measures the strength of the received signal and/or detects a device identifier. The access point then reports the signal strength and/or detected device identifier to the gateway device acting as a controller in the system.

In some embodiments, in response to receiving an indication that a wireless terminal has been detected by an access point, the gateway device can, and in some embodiments does, initiate additional monitoring in the vicinity of the access point which detected the wireless terminal by additional access points in that vicinity. In some such embodiments, this additional monitoring is a concentrated area monitoring. In some embodiments, for power conservation purposes, the access point which initially detected the wireless terminal refrains from monitoring during the monitoring triggered by the detection and reporting of the presence of a wireless terminal. In response to detection of a wireless terminal during the additional monitoring, a detecting access point measures the strength of the received signal and/or detects a device identifier. The access point then reports the signal strength and/or detected device identifier to the gateway device acting as a controller in the system.

In various embodiments, the gateway device uses information obtained from the wide area monitoring and concentrated area monitoring to decide which one or more access points should serve as a point of network attachment for a detected wireless terminal.

An exemplary method of operating a gateway device in accordance with some embodiments includes controlling a first subset of access points, in a plurality of access points, which obtain power from a common power source, to monitor for a signal from a wireless terminal during a first period of time during which at least some access points in said plurality of access points do not monitor for wireless terminal signals, said first subset of access points including one or more access points, said first subset of access points including a first access point. In some such embodiments, the exemplary method further includes receiving a signal from said first access point indicating detection of a signal from a wireless terminal and controlling, in response to receiving said signal indicating detection of a wireless terminal, at least a second access point in said plurality of access points to switch from a non-monitoring mode of operation to a monitoring mode of operation. In some such embodiments, the exemplary method further includes controlling at least the second access point to monitor for wireless terminal signals during a second period of time while said first access point does not monitor for wireless terminal signals.

An exemplary gateway, in accordance with some embodiments, includes at least one processor configured to: control a first subset of access points, in a plurality of access points, which obtain power from a common power source, to monitor for a signal from a wireless terminal during a first period of time during which at least some access points in said plurality of access points do not monitor for wireless terminal signals, said first subset of access points including one or more access points, said first subset of access points including a first access point; receive a signal from said first access point indicating detection of a signal from a wireless terminal; control, in response to receiving said signal indicating detection of a wireless terminal, at least a second access point in said plurality of access points to switch from a non-monitoring mode of operation to a monitoring mode of operation; and control at least the second access point to monitor for wireless terminal signals during a second period of time while said first access point does not monitor for wireless terminal signals. The exemplary gateway device further includes memory coupled to said at least one processor.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

BRIEF DESCRIPTION OF THE DRAWINGS

FIG. 10 illustrates a gateway device selecting and controlling still another subset of access points distributed over a large area to monitor for wireless terminal signals in accordance with an exemplary embodiment.

DETAILED DESCRIPTION

Figure 1:
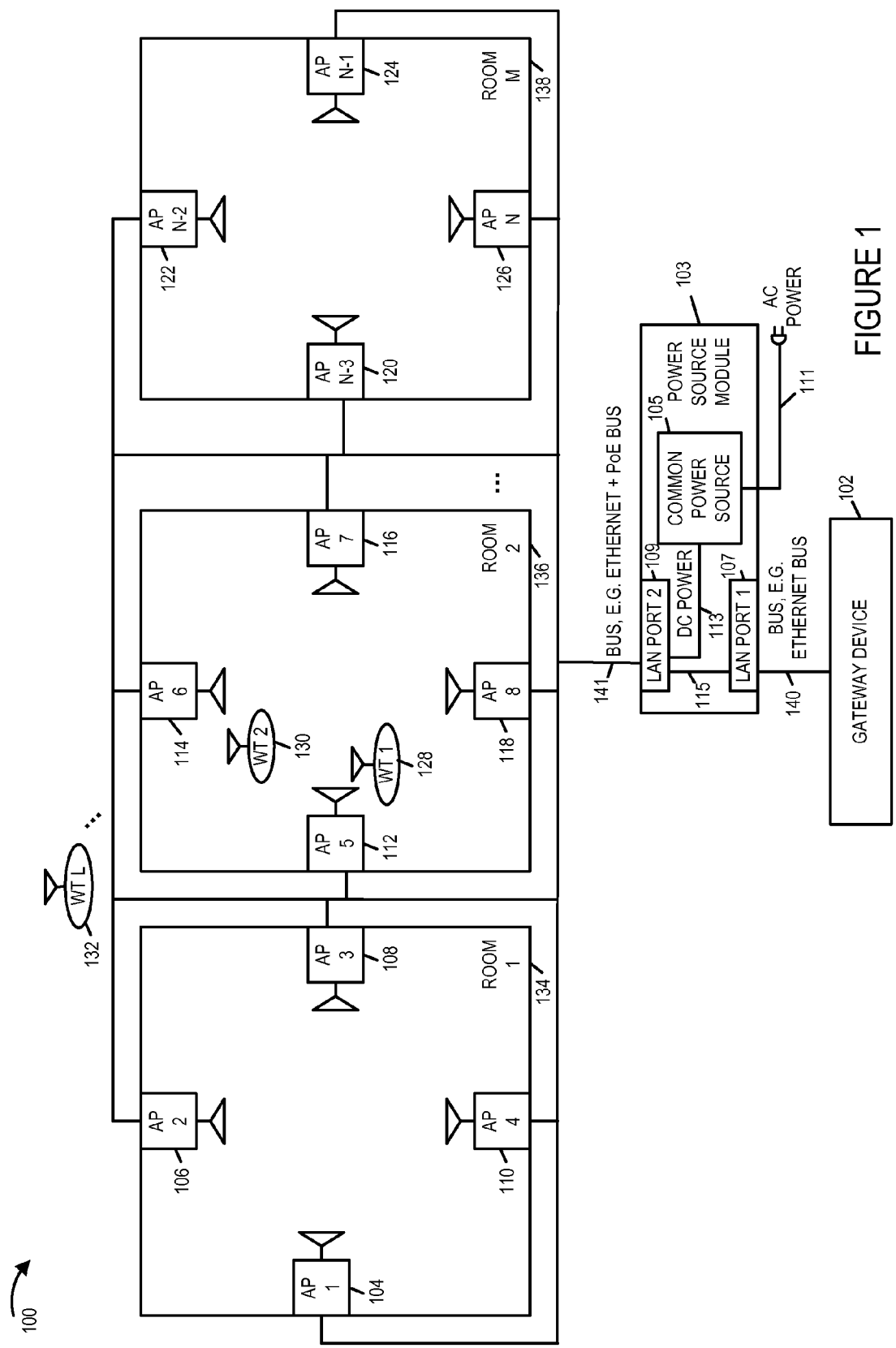
FIG. 1 is a drawing of an exemplary communications system in accordance with an exemplary embodiment.

FIG. 1 is a drawing of an exemplary communications system 100 in accordance with various exemplary embodiment. Exemplary communications system 100 includes a gateway device 102, a power source module 103, and a plurality of access points (access point 1 (AP 1) 104, AP 2 106, AP 3 108, AP 4 110, AP 5 112, AP 6 114, AP 7 116, AP 8 118, ..., AP N−3 120, AP N−2 122, AP N−1 124, AP N 126). The power source module 103 includes a common power source 105, a first LAN port, LAN port 1 107 and a second LAN port, LAN port 2 109. The common power source 105 receives input AC power via input power lines 111 and outputs generated and filtered DC power via output power lines 113. Output power lines 113 are coupled to designated power lines of LAN port 2 109. Gateway device 102 is coupled to LAN port 1 107 of power source module 107 via bus 140, e.g., an Ethernet bus. Within power source module 103, lines 115, couples signal lines of LAN port 1 107 to signal lines of LAN port 2 109 and provides a feed through or filtered feed through for Ethernet communications signals. LAN port 2 109 of power source module 103 is coupled to the access points (AP 1 104, AP 2 106, AP 3 108, AP 4 110, AP 5 112, AP 6 114, AP 7 116, AP 8 118, ..., AP N−3 120, AP N−2 122, AP N−1 124, AP N 126) via a bus 141, e.g., an Ethernet+Power over Ethernet (PoE) bus. In exemplary system 100, AP 1 104, AP 2 106, AP 3 108, and AP 4 110 are included within room 1 134 with each AP (104, 106, 108, 110) mounted on a different wall. AP 5 112, AP 6 114, AP 7 116, and AP 8 118 are included within room 2 136 with each AP (112, 114, 116, 118) mounted on a different wall. AP N−3 120, AP N−2 122, AP N−1 124, and AP N 126 are included within room M 138 with each AP (120, 122, 124, 126) mounted on a different wall.

In some embodiments, the topology is different, e.g., with different size rooms, different numbers of APs in different rooms, and/or with the locations of the APs within the rooms being varied throughout the system. Although illustrated with rooms, it should be appreciated that various possible alternatives of the structure are possible, e.g., with each of the APs coupled to the power source module 103 being located throughout a common open space, or with sets of APs coupled to power source module 103 being located on different floors or within different non-contiguous portions of a building. In some other embodiments, at least some portions of the coverage area corresponding to APs coupled to power source module 103 are outdoors. In still other embodiments, the APs coupled to power source module 103 are within a vehicle, e.g., an airplane, train, ship, or bus. In some embodiments, the power source module 103 is supplied with DC power for input, e.g., with the common power source 105 performing DC to DC voltage level conversions and filtering.

Exemplary communications system 100 further includes a plurality of wireless terminals (WT 1 128, WT 2 130, ..., WT L 132), e.g., mobile nodes, which may move throughout the system 100 and communicate with one or more access points in its vicinity. In the example, of FIG. 1, consider that WT 1 128 and WT 2 130 are currently situated within room 1 and may, and sometimes do, transmit signals, e.g., discovery signals which may be detected by one or more of the APs (112, 114, 116, 118) within room 2 136, which are being controlled by gateway device 102 to monitor for wireless terminal signals. At different times, the gateway device 102 may, and sometimes does, select and control different APs to be monitoring for wireless terminal signals, e.g., in accordance with a predetermined search method and a power distribution budget.

In various embodiments, the predetermined search method includes predetermined time intervals in which a wide area search for WT signals is used, and optional additional time intervals in which a localized search for WT signals is used based on detections in the wide area search. In some embodiments, a first common power source power budget for allocation of AP monitoring applies to the predetermined wide area search intervals and a second common power source power budget for allocation of AP monitoring applies to the optional conditional localized search intervals, and the first and second power budgets are different. In some embodiments, the different power budgets correspond to different numbers of APs being selected and controlled to monitor for WT signals during different types of time intervals.

In some embodiments, first and second common power source power budgets correspond to the power budgets for monitoring purposes during particular time intervals, e.g., power for powering on and operating sets of AP receiver modules during the particular time intervals, there are other power source power budgets, e.g., a power source power budget for operating a set of APs in a sleep mode of operation in which neither the wireless transmitter or the wireless receive is powered on, and a power source power budget for powering on a set of AP transmitter modules.

Within exemplary system 100, there are a large number of access points under control of gateway device 102 which are coupled to the power source module 103 via the bus 141. The AP's are powered from common power source 105 via power lines of bus 141. In various embodiments, there are more access points coupled via bus 141 to common power source 105 102 than can be supported to operate concurrently, e.g., in a particular mode of operation such as a receive mode, based on one or more or all of: the maximum power output capability of common power source 105, the current carrying capabilities of power lines in bus 141, e.g., wire gage limitations, length of wire runs in bus 141, and topology of the LAN including the APs. Gateway 102 selects and controls which access points are to operate at particular points in a timing structure, e.g., selects which subset of access points is to monitor to detect signals transmitted from wireless terminals, e.g., discovery signals from wireless terminals, during a particular timing interval.

In various embodiments, base stations which are being controlled to monitor for wireless terminal signals, report detection of a wireless terminal to the gateway. In some embodiments, the base stations further reports measured received signal strength of detected wireless terminal signals to the gateway. In some embodiments, the gateway makes decisions as to which one or more base stations should be used by a wireless device as its point of network attachment based on the information reported to the gateway, e.g., the gateway selects the base station which received the strongest signal from the wireless terminal as its point of network attachment or the gateway selects the base station with received a signal from the wireless terminal with a signal strength above a predetermined threshold which is already in use by other wireless terminals and has a current traffic load below a predetermined threshold.

Figure 2A:
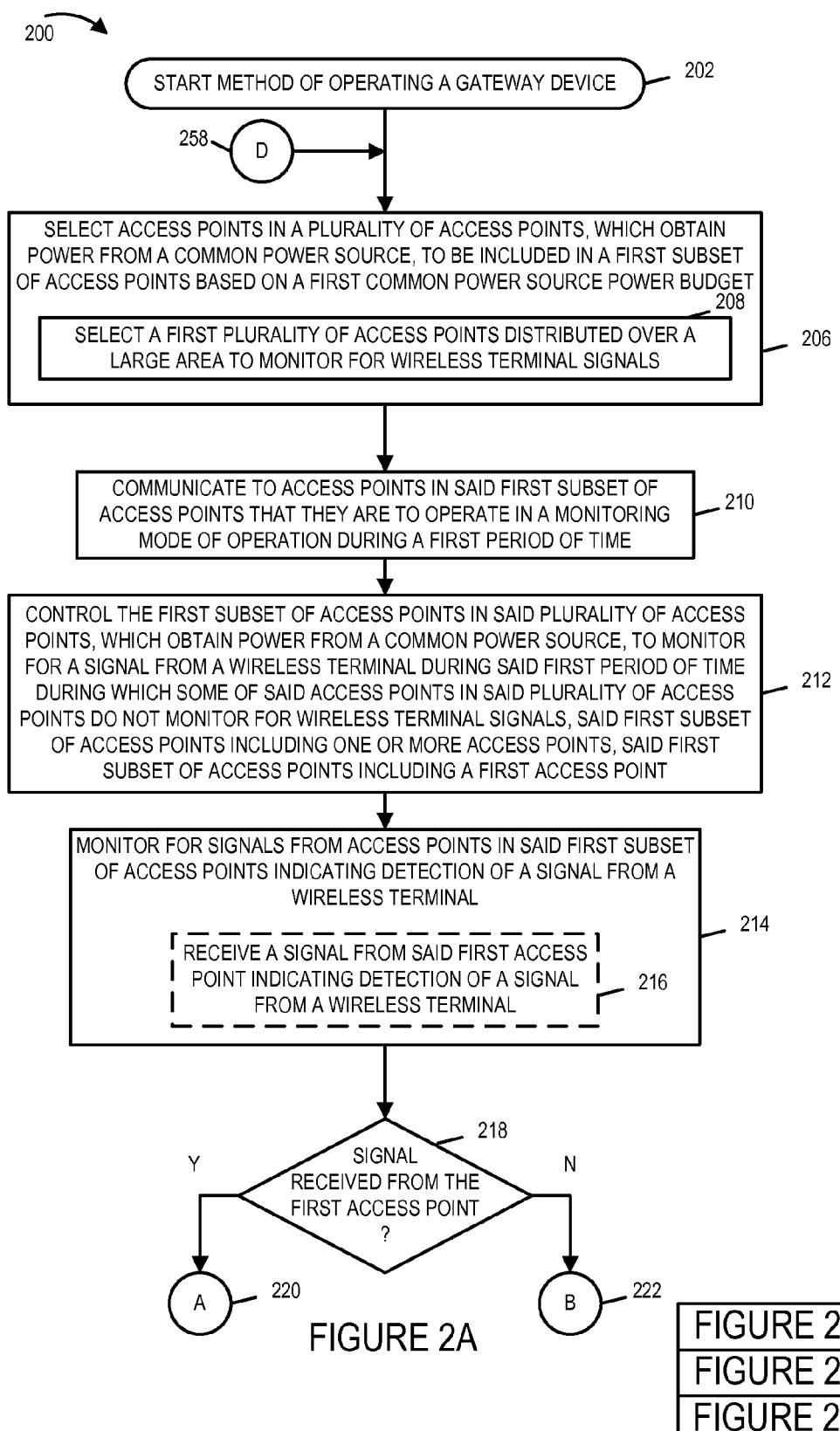
FIG. 2A is a first part of a flowchart of an exemplary method of operating a gateway device in accordance with various exemplary embodiments.
Figure 2B:
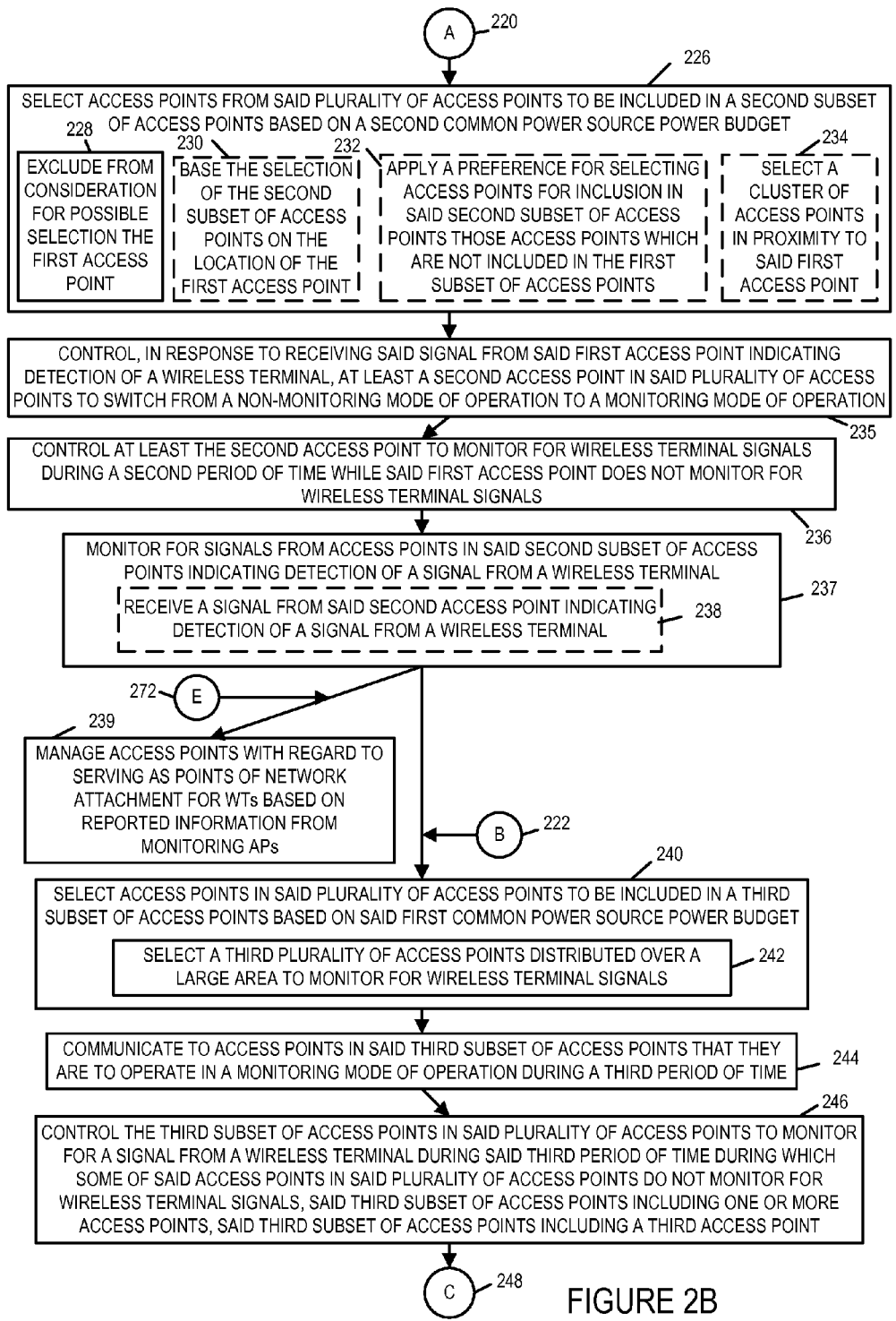
FIG. 2B is a second part of a flowchart of an exemplary method of operating a gateway device in accordance with various exemplary embodiments.
Figure 2C:
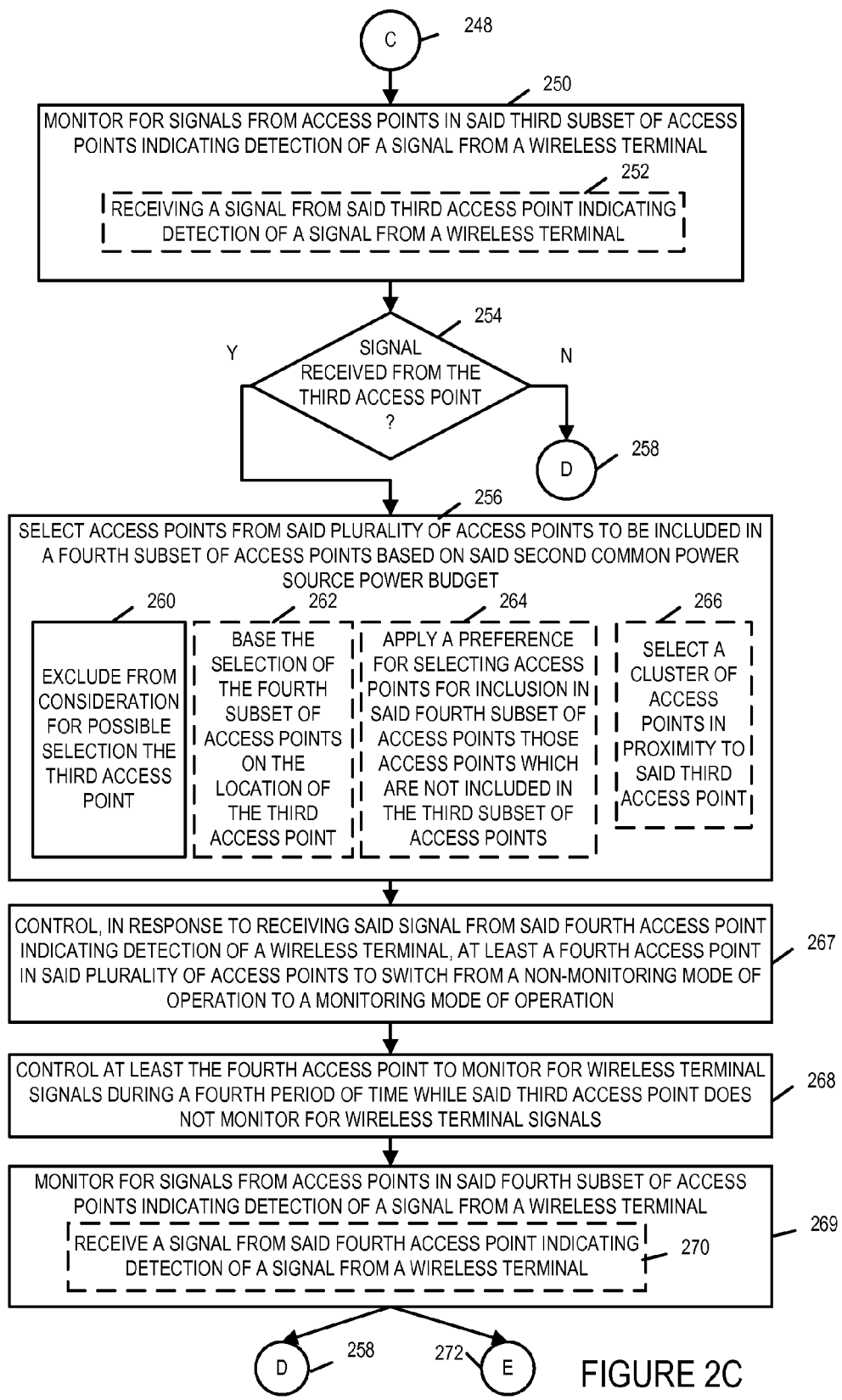
FIG. 2C is a third part of a flowchart of an exemplary method of operating a gateway device in accordance with various exemplary embodiments.

FIG. 2, comprising the combination of FIG. 2A, FIG. 2B, and FIG. 2C, is a flowchart 200 of an exemplary method of operating a gateway device in accordance with various exemplary embodiments. Gateway device 200 is, e.g., gateway device 102 of system 100 of FIG. 1. Operation of the method starts in step 202, where the gateway device 102 is powered on and initialized. Operation proceeds from step 202 to step 206.

In step 206 the gateway device selects access points in a plurality of access points, which obtain power from a common power source, to be included in a first subset of access points based on a first common power source power budget. In some such embodiments, step 206 includes step 208 in which the gateway device selects a first plurality of access points distribute over a large area to monitor for wireless terminal signals. Operation proceeds from step 206 to step 210.

In step 210 the gateway device communicates to access points in said first subset of access points that they are to operate in a monitoring mode of operation during a first period of time. Operation proceeds from step 210 to step 212.

In step 212 the gateway device controls the first subset of access points in said plurality of access points, which obtain power from a common power source, to monitor for a signal from a wireless terminal during said first period of time during which some of said access points in said plurality of access points do not monitor for wireless terminal signals. The first subset of access points includes one or more access points and said first subset of access points including a first access point. Operation proceeds from step 212 to step 214.

In step 214 the gateway device monitors for signals from access points in said first subset of access points indicating detection of a signal by a wireless terminal Step 214 may, and sometimes does, include step 216 in which the gateway device receives a signal from said first access point indicating detection of a signal from a wireless terminal. In some embodiments, the signal received in step 216 includes information indicating the ID of the WT which was detected and/or information indicating a measured signal strength of the detected signal from the detected WT. Operation proceeds from step 214 to step 218.

In step 218 the gateway device determines if a signal was received from the first access point and controls operation as a function of the determination. If a signal was received from the first access point, then operation proceeds from step 218 to step 226 via connecting node A 220; otherwise, operation proceeds from step 220 to step 240, via connecting node B 222.

Returning to step 226, in step 226 the gateway device selects access points from said plurality of access points to be included in a second subset of access points based on a second common power source power budget. In some embodiments, the second common power source power budget is the same as the first common power source power budget. In some other embodiments, the second common power source power budget is different than the first common power source power budget, e.g., lower than the first common power source power budget. In some embodiments, different power budget values correspond to different numbers of access points which may be selected to monitor for wireless terminal signals. Step 226 includes step 228. In some embodiments, step 226 includes one or more or all of steps 230, 232 and 234. In various embodiments, one or more or all of steps 228, 230, 232 and 234 are performed jointly, e.g., in a single combined step. In step 228 the gateway device excludes from consideration for possible selection the first access point. In step 230 the gateway device bases the selection of the second subset of access points on the location of the first access point. In step 232 the gateway device applies a preference for selecting access points for inclusion in said second subset of access points which are not included in said first subset of access points. In step 234 the gateway device selects a cluster of access points in proximity to said first access point. Operation proceeds from step 226 to step 235.

In step 235 the gateway device controls, in response to receiving said signal from said first access point indicating detection of a wireless terminal, at least a second access point in said plurality of access points to switch from a non-monitoring mode of operation to a monitoring mode of operation. In various embodiments, the second access point is a member of the selected second subset of access points. In some embodiments, the gateway device controls, in response to receiving said signal from the first access point indicating detection of a wireless terminal, each of the access points in said second subset of access points to switch from a non-monitoring mode of operation to a monitoring mode of operation. Operation proceeds from step 235 to step 236.

In step 236 the gateway device controls at least the second access point to monitor for wireless terminal signals during a second period of time while said first access point does not monitor for wireless terminal signals. In some embodiments, the gateway device controls each of the access points in said selected second subset of access points to monitor for wireless terminal signals during the second period of time while said first access point does not monitor for wireless terminal signals. Operation proceeds from step 236 to step 237.

In step 237 the gateway device monitors for signals from access points in said second subset of access points indicating detection of a signal from a wireless terminal. The gateway device may, and sometimes does receive a signal from one or more of the access points in the second subset of access points indicating detection of a signal from a wireless terminal Step 237 may, and sometimes does, include step 238 in which the gateway device receives a signal from said second access point indicating detection of a signal from a wireless terminal. In some embodiments, the signal received in step 238 includes information indicating the ID of the WT which was detected and/or information indicating a measured signal strength of the detected signal from the detected WT. Operation proceeds from step 237 to step 239 and step 240.

In step 239 the gateway device manages access points with regard to serving as points of network attachment for WTs based on the reported information from the monitoring APs. For example, the gateway device may select which access points from among those access points which detected a signal from a wireless terminal is to serve as the wireless terminals point of network attachment. The decision may be based on one or more or all of: a reported received signal strength measurement, whether or not an AP is currently serving other WTs, and current loading at an AP with regard to traffic load.

In step 240 the gateway device selects access points in said plurality of access points, which obtain power from a common power source, to be included in a third subset of access points based on the first common power source power budget. In some such embodiments, step 240 includes step 242 in which the gateway device selects a third plurality of access points distributed over a large area to monitor for wireless terminal signals. Operation proceeds from step 240 to step 244.

In step 244 the gateway device communicates to access points in said third subset of access points that they are to operate in a monitoring mode of operation during a third period of time. Operation proceeds from step 244 to step 246.

In step 246 the gateway device controls the third subset of access points in said plurality of access points to monitor for a signal from a wireless terminal during said third period of time during which some of said access points in said plurality of access points to not monitor for wireless terminal signals. The third subset of access points includes one or more access points and said third subset of access points including a third access point. Operation proceeds from step 246, via connecting node C 248, to step 250.

In step 250 the gateway device monitors for signals from access points in said third subset of access points indicating detection of a signal by a wireless terminal Step 250 may, and sometimes does, include step 252 in which the gateway device receives a signal from said third access point indicating detection of a signal from a wireless terminal. In some embodiments, the signal received in step 252 includes information indicating the ID of the WT which was detected and/or information indicating a measured signal strength of the detected signal from the detected WT. Operation proceeds from step 250 to step 254.

In step 254 the gateway device determines if a signal was received from the third access point and controls operation as a function of the determination. If a signal was received from the third access point, then operation proceeds from step 254 to step 256; otherwise, operation proceeds from step 254 to step 206, via connecting node D 258.

Returning to step 256, in step 256 the gateway device selects access points from said plurality of access points to be included in a fourth subset of access points based on said second common power source power budget. Step 256 includes step 260. In some embodiments, step 256 includes one or more or all of steps 262, 264 and 266. In various embodiments, one or more or all of steps 260, 262, 264 and 266 are performed jointly, e.g., in a single combined step. In step 260 the gateway device excludes from consideration for possible selection the third access point. In step 262 the gateway device bases the selection of the fourth subset of access points on the location of the third access point. In step 264 the gateway device applies a preference for selecting access points for inclusion in said fourth subset of access points which are not included in said third subset of access points. In step 266 the gateway device selects a cluster of access points in proximity to said third access point. Operation proceeds from step 256 to step 267.

In step 267 the gateway device controls, in response to receiving said signal from said third access point indicating detection of a wireless terminal, at least a fourth access point in said plurality of access points to switch from a non-monitoring mode of operation to a monitoring mode of operation. In various embodiments, the fourth access point is a member of the selected fourth subset of access points. In some embodiments, the gateway device controls, in response to receiving said signal from said third access point indicating detection of a wireless terminal, each of the access points in said fourth subset of access points to switch from a non-monitoring mode of operation to a monitoring mode of operation.

Operation proceeds from step 267 to step 268. In step 268 the gateway device controls at least the fourth access point to monitor for wireless terminal signals during a fourth period of time while said third access point does not monitor for wireless terminal signals. In some embodiments, the gateway device controls each of the access points in said selected fourth subset of access points to monitor for wireless terminal signals during the fourth period of time while said first access point does not monitor for wireless terminal signals. Operation proceeds from step 268 to step 269.

In step 269, the gateway device monitors for signals from the access points in said fourth subset of access points indicating detection of a wireless terminal. The gateway device may, and sometimes does receive a signal from one or more of the access points in the fourth subset of access points indicating detection of a signal from a wireless terminal Step 269 may, and sometime does, include step 270 in which the gateway device receives a signal from said fourth access point indicating detection of a signal form a wireless terminal. In some embodiments, the signal received in step 270 includes information indicating the ID of the WT which was detected and/or information indicating a measured signal strength of the detected signal from the detected WT.

Operation proceeds from step 269 to step 239 via connecting node E 272 and to step 206 via connecting node D 258.

In some embodiments, first and third subsets of access points correspond to first and third time periods, respectively, which are routinely scheduled monitoring periods during which a particular, e.g., widely dispersed subset of access points, which obtain power from the common power source, perform monitoring. The second period of time and second subset correspond to a period and subset of access points which is initiated by the detection of a wireless terminal signal by the first access point. For power conservation reasons, the first access point does not monitor during the second period of time, but one or preferably a cluster of access points in the proximity to the first access point monitor for signals from the wireless terminal. Similarly, the fourth period of time and fourth subset correspond to a period and subset of access points which is initiated by the detection of a wireless terminal signal by the third access point. For power conservation reasons, the third access point does not monitor during the fourth period of time, but one or preferably a cluster of access points in the proximity to the third access point monitor for signals from the wireless terminal.

Thus during the detected signal initiated period of time, e.g., during a second time period or during a fourth time period, more clustered monitoring is performed, in some embodiments. In some embodiments, the power budget for the triggered monitoring is more limited than the power budget for the routinely scheduled monitoring. The gateway device has knowledge of the topology and can use that knowledge in selecting access points to monitor during the second period of time or during the fourth time period. Routinely scheduled monitoring may involve groups of access points, e.g., potentially distinct groups, taking turns at monitoring for wireless terminal signals. In some embodiments, a fixed or relatively constant common power source power budget may be used for selecting access points to perform the routine monitoring, e.g., a similar number of access points will perform monitoring during each routine scheduled monitoring interval with the different groups proceeding to monitor according to a sequence in some embodiments.

Figure 3:
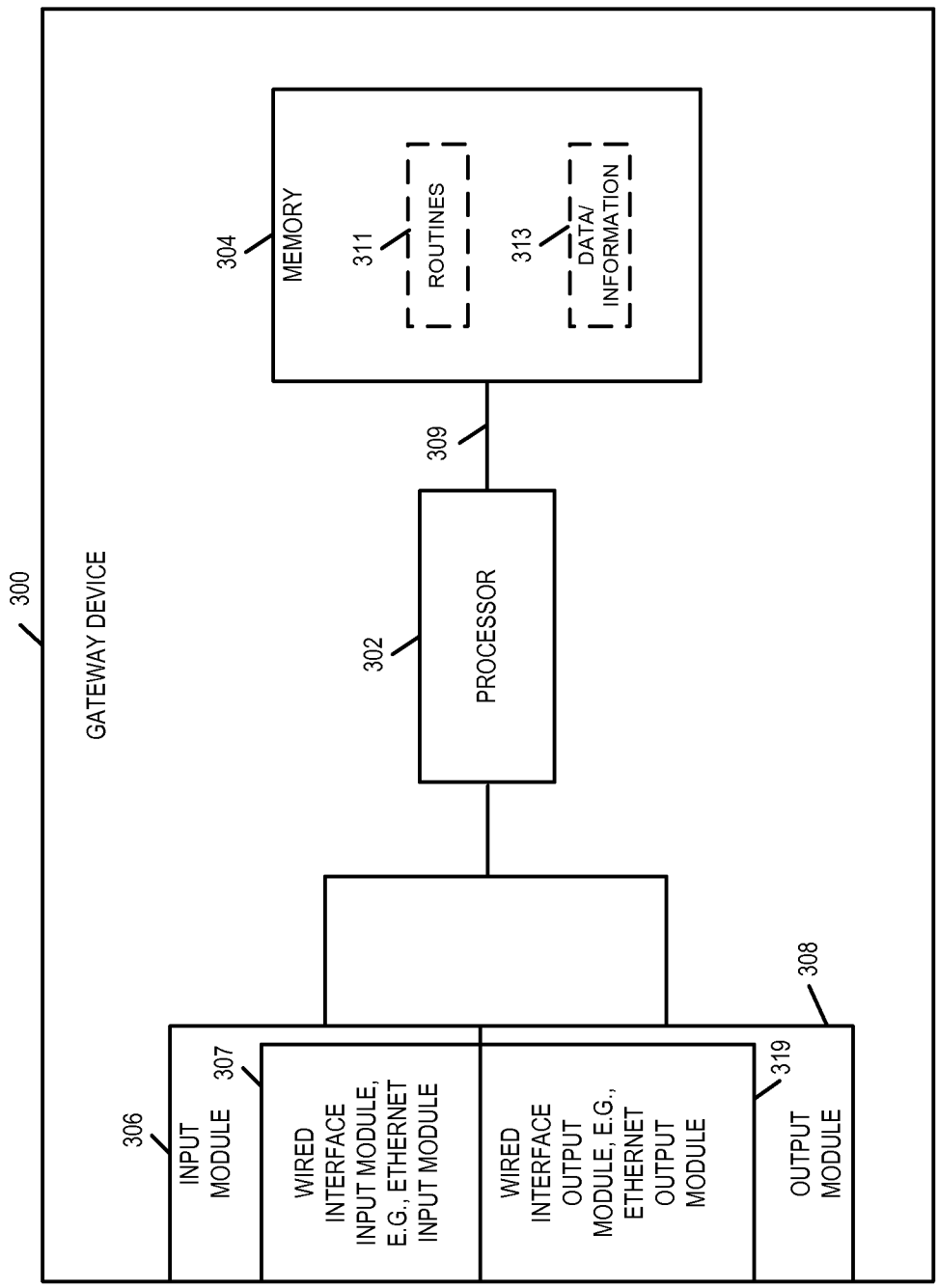
FIG. 3 is a drawing of an exemplary gateway device in accordance with an exemplary embodiment.

FIG. 3 is a drawing of an exemplary gateway device 300 in accordance with an exemplary embodiment. Exemplary gateway device 300 is, e.g., gateway device 102 of system 100 of FIG. 1. Exemplary gateway device 300 may, and sometimes does, implement a method in accordance with flowchart 200 of FIG. 2.

Gateway device 300 includes a processor 302 and memory 304 coupled together via a bus 309 over which the various elements (302, 304) may interchange data and information. Gateway device 300 further includes an input module 306 and an output module 308 which may be coupled to processor 302 as shown. However, in some embodiments, the input module 306 and output module 308 are located internal to the processor 302. Input module 306 can receive input signals. Input module 306 includes a wired interface input module 307, e.g., an Ethernet input module, for receiving input. In some embodiments, input module 306 includes a wireless input interface and/or an optical input interface for receiving input.

Output module 308 includes a wired interface output module 319, e.g., an Ethernet output module, for transmitting output. Output module 308 can, and in some embodiments does also include, a wireless output interface and/or an optical output interface for transmitting output.

In some embodiments, memory 304 includes routines 311 and data/information 313. Data/information includes, e.g., a first bus power budget, a second bus power budget, timing structure information, information identifying the locations of different APs, receive signal strength threshold levels, predetermined sequences used for selecting which APs to be included in first and third subsets, information identifying which APs are currently serving as points of network attachment, AP traffic loading information, information identifying WTs and corresponding selected points of network attachment, information identifying a selected first subset of APs, information identifying a selected second subset of APs, information identifying a selected third subset of APs, and information identifying a selected fourth subset of APs.

In some embodiments, processor 302 is configured to: control a first subset of access points, in a plurality of access points, which obtain power from a common power source, to monitor for a signal from a wireless terminal during a first period of time during which at least some access points in said plurality of access points do not monitor for wireless terminal signals. The first subset of access points includes one or more access points, and said first subset of access points includes a first access point. In some such embodiments, processor 302 is further configured to: receive a signal from said first access point indicating detection of a signal from a wireless terminal and control, in response to receiving said signal indicating detection of a wireless terminal, at least a second access point in said plurality of access points to switch from a non-monitoring mode of operation to a monitoring mode of operation; and control at least the second access point to monitor for wireless terminal signals during a second period of time while said first access point does not monitor for wireless terminal signals.

In various embodiments, processor 302 is further configured to: select access points in said plurality of access points to be included in said first subset of access points based on a first common power source power budget; and communicate to access points in said first subset of access points that they are to operate in a monitoring mode of operation during said first period of time. In some embodiments, processor 302 is configured to select a first plurality of access points distributed over a large area to monitor for wireless terminal signals, as part of being configured to selecting access points to be included in said first subset of access points.

In various embodiments, processor 302 is further configured to: select access points in said plurality of access points to be included in a second subset of access points based on a second common power source power budget, and processor 302 is configured to exclude from consideration for possible selection said first access point, as part of being configured to select access points to be included in a second subset of access points. In some embodiments, processor 302 is configured to base the selection of the second subset of access points on the location of said first access point, as part of being configured to select access points to be included in a second subset of access points. In some embodiments, processor 302 is configured to apply a preference for selecting access points for inclusion in said second subset of access points which were not included in said first subset of access points, as part of being configured to select access points to be included in a second subset of access points. In various embodiments, processor 302 is configured to select a cluster of access points in proximity to said first access point, as part of being configured to select access points to be included in a second subset of access points.

In some embodiments, processor 302 is configured to: select access points from said plurality of access points to be included in a third subset of access points based on said first common power source power budget; and communicate to access points in said third subset of access points that they are to operate in a monitoring mode of operation during a third period of time. In some such embodiments, communicating to access points in said third subset of access points that they are to operate in a monitoring mode of operation during a third period of time includes sending a message to the access points in the third set of access points.

Figures 4, 4A:
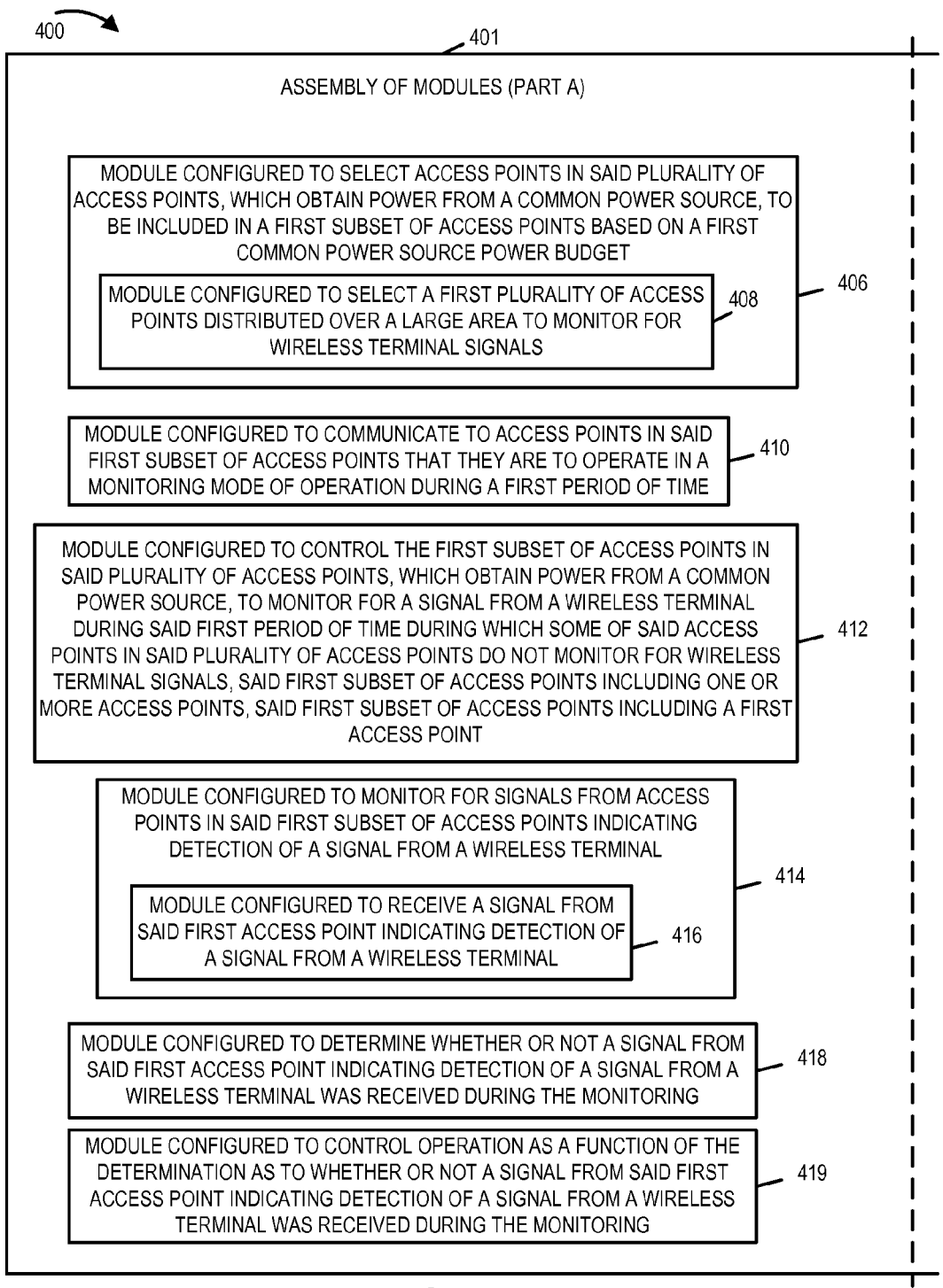
FIG. 4A is a first portion of an assembly of modules which can, and in some embodiments is, used in the exemplary gateway device illustrated in FIG. 3.

FIG. 4 is an assembly of modules 400 which can, and in some embodiments is, used in the exemplary gateway device 300 illustrated in FIG. 3. The modules in the assembly 400 can be implemented in hardware within the processor 302 of FIG. 3, e.g., as individual circuits. Alternatively, the modules may be implemented in software and stored in the memory 304 of gateway device 300 shown in FIG. 3. In some such embodiments, the assembly of modules 400 is included in routines 311 of memory 304 of device 300 of FIG. 3. While shown in the FIG. 3 embodiment as a single processor, e.g., computer, it should be appreciated that the processor 302 may be implemented as one or more processors, e.g., computers. When implemented in software the modules include code, which when executed by the processor, configure the processor, e.g., computer, 302 to implement the function corresponding to the module. In some embodiments, processor 302 is configured to implement each of the modules of the assembly of modules 400. In some embodiments where the assembly of modules 400 is stored in the memory 304, the memory 304 is a computer program product comprising a computer readable medium, e.g., a non-transitory computer readable medium, comprising code, e.g., individual code for each module, for causing at least one computer, e.g., processor 302, to implement the functions to which the modules correspond.

Completely hardware based or completely software based modules may be used. However, it should be appreciated that any combination of software and hardware (e.g., circuit implemented) modules may be used to implement the functions. As should be appreciated, the modules illustrated in FIG. 4 control and/or configure the gateway device 300 or elements therein such as the processor 302, to perform the functions of the corresponding steps illustrated and/or described in the method of flowchart 200 of FIG. 2.

Figure 4B:
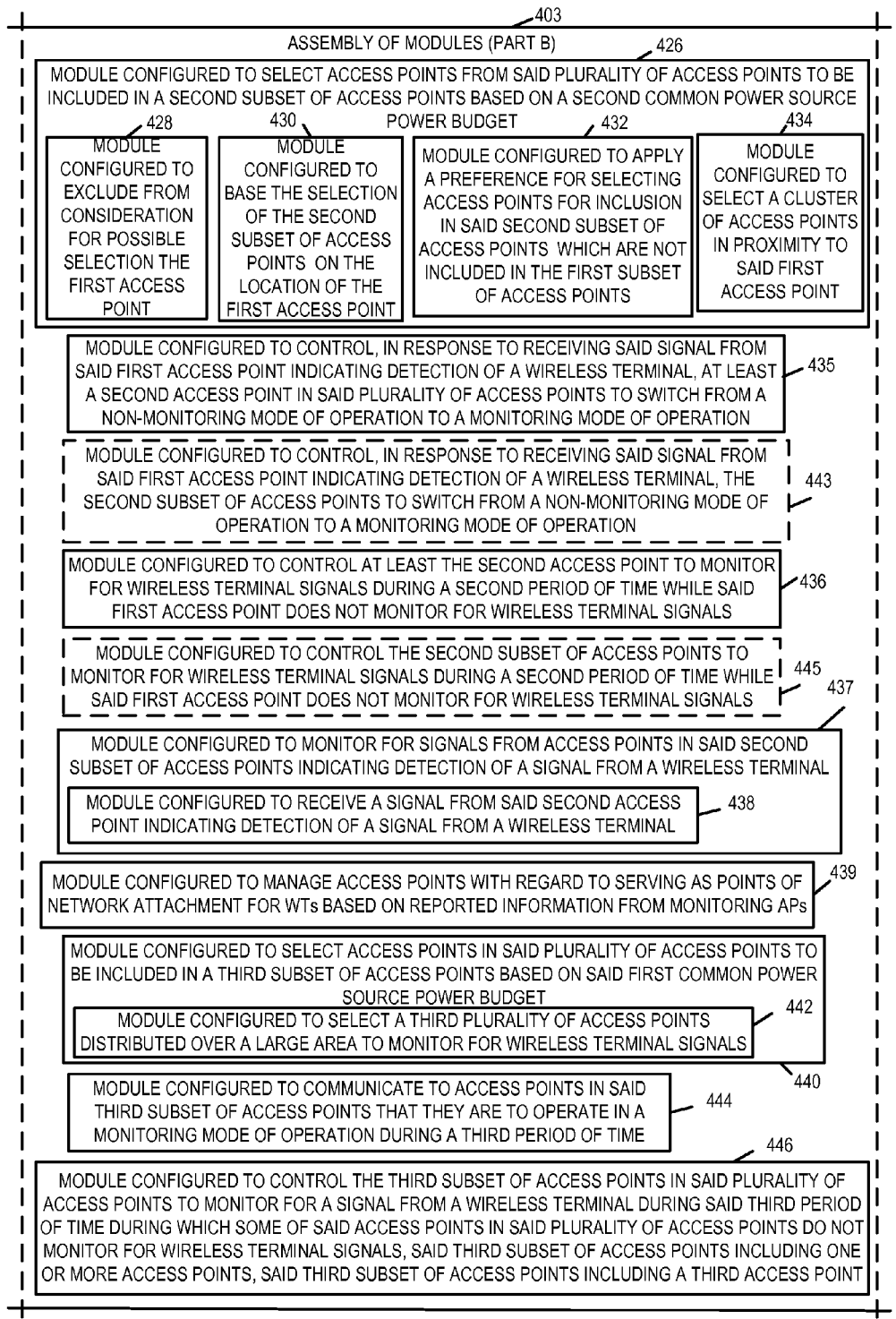
FIG. 4B is a second portion of an assembly of modules which can, and in some embodiments is, used in the exemplary gateway device illustrated in FIG. 3.
Figure 4C:
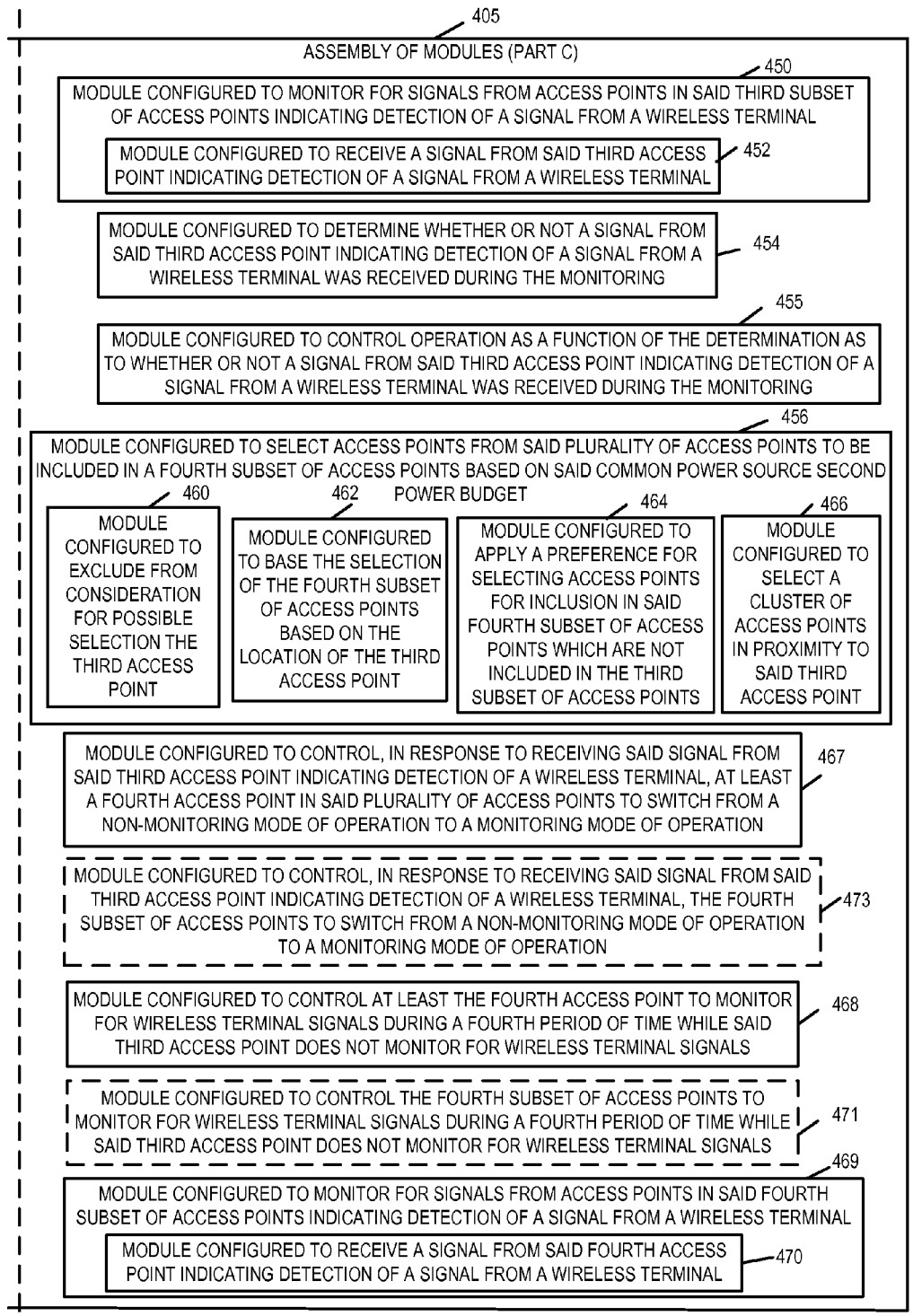
FIG. 4C is a third portion of an assembly of modules which can, and in some embodiments is, used in the exemplary gateway device illustrated in FIG. 3.

FIG. 4, comprising the combination of FIG. 4A, FIG. 4B, and FIG. 4C illustrates an assembly of modules 400, comprising the combination of Part A 401, Part B 403, and Part C 405. Assembly of modules 400 includes a module 406 configured to select access points in a plurality of access points, which obtain power from a common power source, to be included in a first subset of access points based on a first common power source power budget, a module 410 configured to communicate to access points in said first subset of access points that they are to operate in a monitoring mode of operation during a first period of time, and a module 412 configured to control the first subset of access points in said plurality of access points to monitor for a signal from a wireless terminal during a said first period of time during which some of said access point in said plurality of access points do not monitor for wireless terminal signals, said first subset of access points include one or more access points, said first subset of access points including a first access point. Module 406 includes a module 408 configured to select a first plurality of access points distributed over a large area to monitor for wireless terminal signals.

Assembly of modules 400 further includes a module 414 configured to monitor for signals from access points in said first subset of access points indicating detection of a signal from a wireless terminal. Module 414 includes a module 416 configured to receive a signal from said first access point indicating detection of a signal from a wireless terminal. Assembly of modules 400 further includes a module 418 configured to determine whether or not a signal from said first access point indication detection of a signal from a wireless terminal was received during the monitoring, and a module 419 configured to control operation as a function of the determination as to whether or not a signal from said first access point indicating detection of a signal from a wireless terminal was received during the monitoring.

Assembly of modules 400 further includes a module 426 configured to select access points from said plurality of access points to be included in a second subset of access points based on a second common power source power budget. Module 426 includes a module 428 configured to exclude from consideration for possible selection the first access point, a module 430 configured to base the selection of the second subset of access points on the location of the first access point, a module 432 configured to apply a preference for selecting access points for inclusion in said second subset of access points those access points which are not included in the first subset of access points, and a module 434 configured to select a cluster of access points in proximity to said first access point. Assembly of modules 400 further includes a module 435 configured to control, in response to receiving a signal from the first access point indicating detection of a wireless terminal, at least a second access point in said plurality of access points to switch from a non-monitoring mode of operation to a monitoring mode of operation and a module 436 configured to control at least the second access point to monitor for wireless terminal signals during a second period of time while said first access point does not monitor for wireless terminal signals. In some embodiments, assembly of modules 400 includes one or both of a module 443 configured to control, in response to receiving said signal from said first access point indicating detection of a wireless terminal, the second subset of access points to switch from a non-monitoring mode of operation to a monitoring mode of operation and a module 445 configured to control the second subset of access points to monitor for wireless terminal signals during a second period of time while said first access point does not monitor for wireless terminal signals. Assembly of modules 400 further includes a module 437 configured to monitor for signals from access points in said second subset of access points indicating detection of a signal from a wireless terminal. Module 437 includes a module 438 configured to receive a signal from said second access point indicating detection of a signal from a wireless terminal. Assembly of modules 400 further includes a module 439 configured to manage access points with regard to serving as points of network attachment for WTs based on reported information from monitoring APs.

Assembly of modules 400 further includes a module 440 configured to select access points in said plurality of access points to be included in a third subset of access points based on said first common power source power budget, a module 444 configured to communicate to access points in said third subset of access points that they are to operate in a monitoring mode of operation during a third period of time, and a module 446 configured to control the third subset of access points in said plurality of access points to monitor for a signal from a wireless terminal during a said third period of time during which some of said access point in said plurality of access points do not monitor for wireless terminal signal, said third subset of access points include one or more access points, said third subset of access points including a third access point. Module 440 includes a module 442 configured to select a third plurality of access points distributed over a large area to monitor for wireless terminal signals.

Assembly of modules 400 further includes a module 450 configured to monitor for signals from access points in said third subset of access points indicating detection of a signal from a wireless terminal. Module 450 includes a module 452 configured to receive a signal from said third access point indicating detection of a signal from a wireless terminal. Assembly of modules 400 further includes a module 454 configured to determine whether or not a signal from said third access point indicating detection of a signal from a wireless terminal was received during the monitoring, and a module 455 configured to control operation as a function of the determination as to whether or not a signal from said third access point indicating detection of a signal from a wireless terminal was received during the monitoring.

Assembly of modules 400 further includes a module 456 configured to select access points from said plurality of access points to be included in a fourth subset of access points based on the second common power source power budget. Module 456 includes a module 460 configured to exclude from consideration for possible selection the third access point, a module 462 configured to base the selection of the fourth subset of access points on the location of the third access point, a module 464 configured to apply a preference for selecting access points for inclusion in said fourth subset of access points which are not included in the third subset of access points, and a module 466 configured to select a cluster of access points in proximity to said third access point. Assembly of modules 400 further includes a module 467 configured to control, in response to receiving said signal from said third access point indicating detection of a wireless terminal, at least a fourth access point in said plurality of access points to switch from a non-monitoring mode of operation to a monitoring mode of operation, and a module 468 configured to control at least the fourth access point to monitor for wireless terminal signals during a fourth period of time while said third access point does not monitor for wireless terminal signals.

Figure 5:
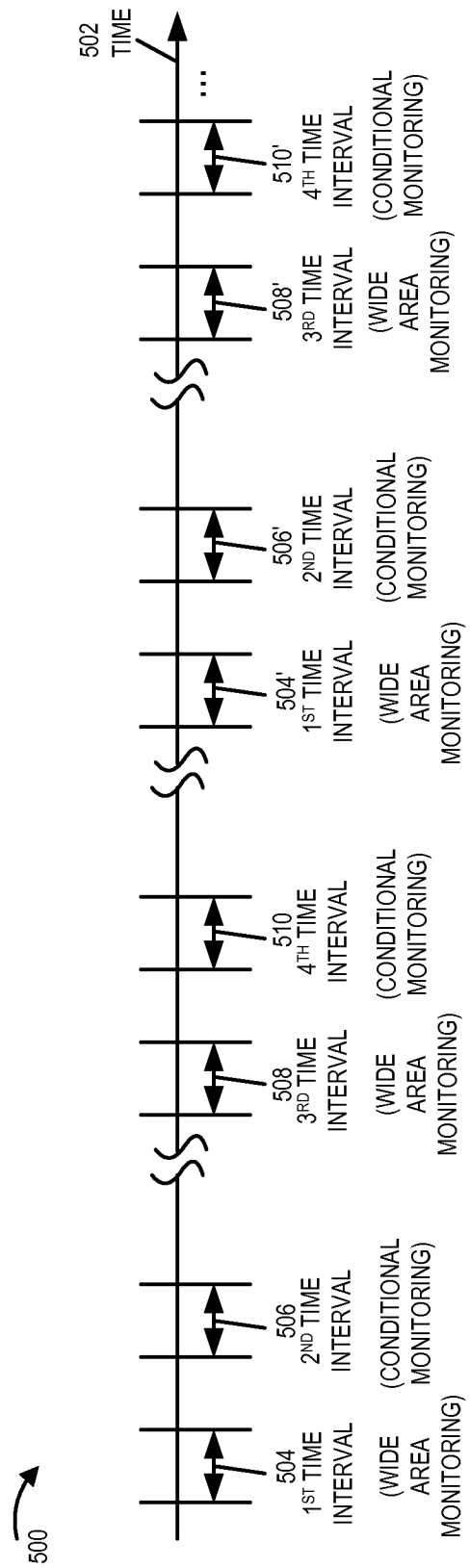
FIG. 5 is a drawing illustrating exemplary sets of recurring time intervals including wide area monitoring time intervals and conditional monitoring time intervals in an exemplary recurring timing frequency structure in accordance with an exemplary embodiment.

In some embodiments, assembly of modules 400 includes one or both of a module 473 configured to control, in response to receiving said signal from said third access point indicating detection of a wireless terminal, the fourth subset of access points to switch from a non-monitoring mode of operation to a monitoring mode of operation and a module 471 configured to control the fourth subset of access points to monitor for wireless terminal signals during a fourth period of time while said third access point does not monitor for wireless terminal signals. Assembly of modules 400 further includes a module 469 configured to monitor for signals from access points in said fourth subset of access points indicating detection of a signal from a wireless terminal. Module 469 includes a module 470 configured to receive a signal from said fourth access point indicating detection of a signal from a wireless terminal FIG. 5 is a drawing 500 illustrating an exemplary time intervals in an exemplary recurring timing structure in accordance with various embodiments. Drawing 500 includes a horizontal axis 502 representing time. Drawing 500 also illustrates a plurality of exemplary time intervals ($1^{st}$ time interval 504, $2^{nd}$ time interval 506, $3^{rd}$ time interval 508, $4^{th}$ time interval 510, $1^{st}$ time interval 504', $2^{nd}$ time interval 506', 3rd time interval 508', $4^{th}$ time interval 510').

1st time interval 504 is a wide area monitoring time interval. During 1st time interval 504, a subset of selected APs, which were selected by a gateway device in accordance with a first common power source power budget and which were selected to provide monitoring for WTs over a large coverage area, are controlled to operate in a monitoring mode and controlled to monitor for WT signals.

2nd time interval 506 is a conditional monitoring time interval. If a WT was detected during monitoring of the 1st time interval 504, then additional monitoring is performed during the 2nd time interval 508. If a WT was detected during the 1st time interval 504, then during 2nd time interval 506, a subset of selected APs, which were selected by a gateway device in accordance with a second common power source power budget and which were selected based on which AP detected the WT in the 1st time interval 504, are controlled to operate in a monitoring mode and controlled to monitor for WT signals.

3rd time interval 508 is a wide area monitoring time interval. During 3rd time interval 508, a subset of selected APs, which were selected by a gateway device in accordance with a first common power source power budget and which were selected to provide monitoring for WTs over a large coverage area, are controlled to operate in a monitoring mode and controlled to monitor for WT signals.

4th time interval 510 is a conditional monitoring time interval. If a WT was detected during monitoring of the 3rd time interval 508, then additional monitoring is performed in the 4th time interval 510. If a WT was detected during the 3rd time interval 508, then during the 4th time interval 510, a subset of selected APs, which were selected by a gateway device in accordance with the second common power source power budget and which were selected based on which AP detected the WT in the 3rd time interval 508, are controlled to operate in a monitoring mode and controlled to monitor for WT signals.

1st time interval 504' is a wide area monitoring time interval. During 1st time interval 504', a subset of selected APs, which were selected by a gateway device in accordance with a first common power source power budget and which were selected to provide monitoring for WTs over a large coverage area, are controlled to operate in a monitoring mode and controlled to monitor for WT signals.

2nd time interval 506' is a conditional monitoring time interval. If a WT was detected during monitoring of the 1st time interval 504', then additional monitoring is performed during the 2nd time interval 506'. If a WT was detected during the 1st time interval 504', then during the 2nd time interval 506', a subset of selected APs, which were selected by a gateway device in accordance with the second common power source power budget and which were selected based on which AP detected the WT in the 1st time interval 504', are controlled to operate in a monitoring mode and controlled to monitor for WT signals.

3rd time interval 508' is a wide area monitoring time interval. During 3rd time interval 508', a subset of selected APs, which were selected by a gateway device in accordance with a first common power source power budget and which were selected to provide monitoring for WTs over a large coverage area, are controlled to operate in a monitoring mode and controlled to monitor for WT signals.

4th time interval 510' is a conditional monitoring time interval. If a WT was detected during monitoring of the 3rd time interval 508', then additional monitoring is performed during the 4th time interval 510'. If a WT was detected during the 3rd time interval 508', then during the 4th time interval 510', a subset of selected APs, which were selected by a gateway device in accordance with the second common power source power budget and which were selected based on which AP detected the WT in the 3rd time interval 508', are controlled to operate in a monitoring mode and controlled to monitor for WT signals.

In some embodiments, the first and third time intervals are the same duration. In other embodiments, the first and third time intervals are different sizes.

Figure 6:
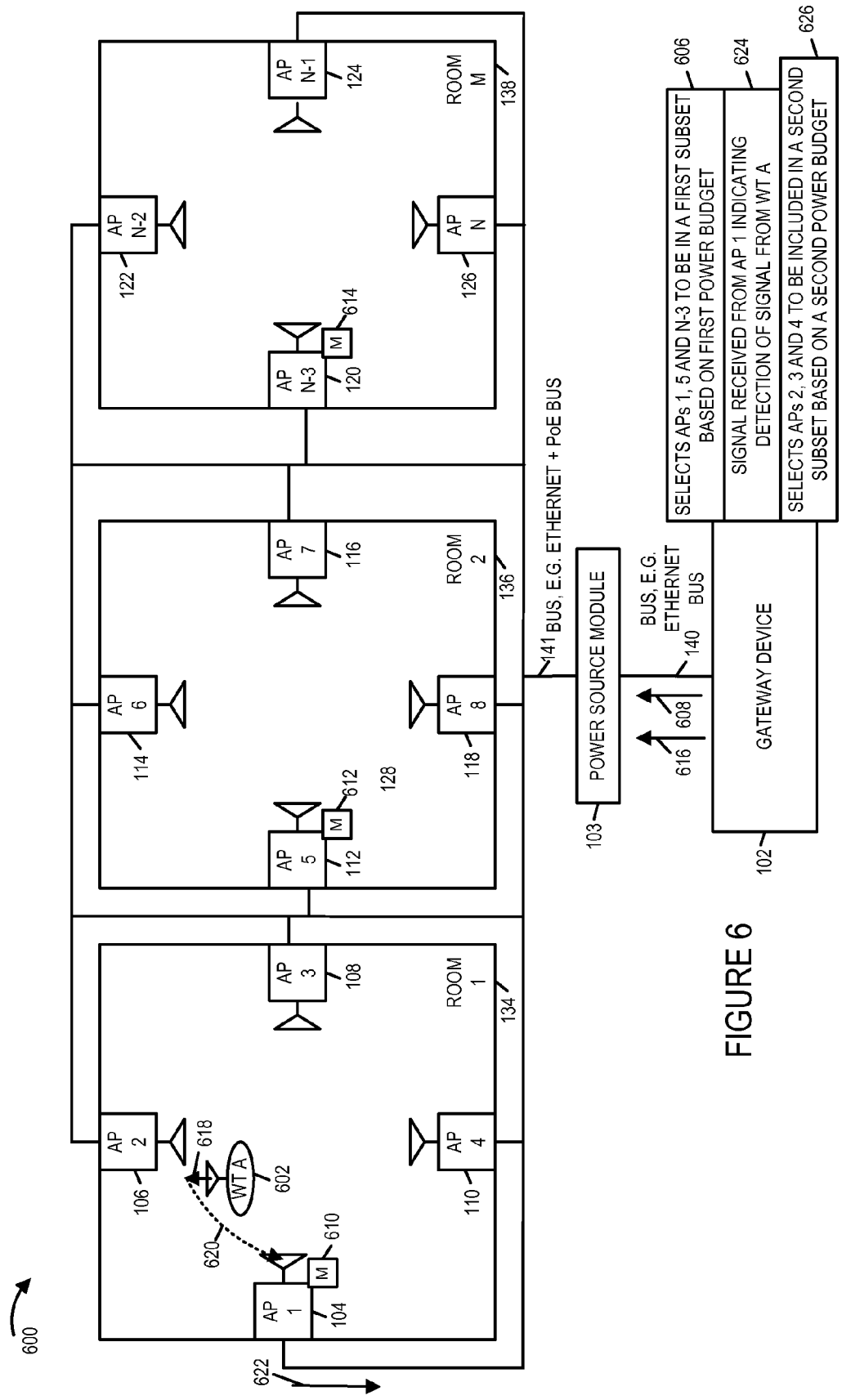
FIG. 6 illustrates a gateway device selecting and controlling a subset of access points distributed over a large area to monitor for wireless terminal signals in accordance with an exemplary embodiment.

FIGS. 6-11 illustrate an example in which a gateway device selects and controls subsets of access points to monitor for wireless terminals in accordance with an exemplary embodiment. FIG. 6 illustrates a drawing 600 including the exemplary access points (104, 106, 108, 110, 112, 114, 116, 118, 120, 122, 124, 126), exemplary power source module 103 and exemplary gateway device 102 coupled together via bus 140 and bus 141 as shown and previously described in FIG. 1.

The power source module 103 includes common power source 105 which supplies power to the plurality of access points (104, 106, 108, 110, 112, 114, 116, 118, 120, 122, 124, 126). Gateway device 102 selects AP 1 104, AP 5 112, AP N−3 120 to be included in a first subset of access points based on a first common power source power budget, as indicated by block 606. The gateway device has intentionally selected the first subset of access points to be access points which are distributed over a large area to monitor for wireless terminal signals. Gateway device 102 generates and communicates signal 608 to the access points in the first subset (104, 112, 120) which notifies the access points (104, 112, 120) that they are to operate in a monitoring mode of operation during a first time period. APs (104, 112, 120) receive signal 608 and prepare to monitor for wireless terminal signals during the upcoming first period of time, as indicated by blocks with "M" (610, 612, 614), respectively. Gateway device 102 generates and transmits control signal 616 which controls the first subset of access points (104, 112, 120) to monitor for a signal from a wireless terminal during said first period of time.

During the first period of time, WT A 602 transmits signal 618, e.g., a discovery signal communicating device ID information or information used to derive device ID information. AP 1 104 which has its wireless receiver powered on and its being controlled to monitor for signals from WTs, receive signal 618 as indicated by dotted line arrow 620. AP 1 104 measures the received power of the received signal, and recovers information being communicated in signal 618. AP 1 104, generates and transmits signal 622 to gateway device 102 communicating information indicating that AP 1 104 has detected a signal from a WT. In some embodiments, signal 622 further includes one or more of: information identifying WT A 602 as the device which transmitted the detected signal and the measured received signal strength at AP 1 104 of the received detected signal.

Gateway device 102 has been monitoring for signals from access points in the first subset indicating the detection of a signal from a wireless terminal Gateway device 102 receives signal 622 from AP 1 104 indicating that AP 1 104 detected a signal from WT A 602.

In response to received signal 622, the gateway device selects access points to be included in a second subset of access points based on a second common power source power budget. Gateway device 102 intentionally excludes AP 1 104 for consideration for inclusion in the second subset since AP 1 104 was included in the first subset. The gateway device 102 selects AP 2 106, AP 3 108 and AP 4 110 for inclusion in the second subset of access points. APs (106, 108, 110) are a cluster of access points in close proximity to AP 1 104, which were not included in the first subset of access points.

Figure 7:
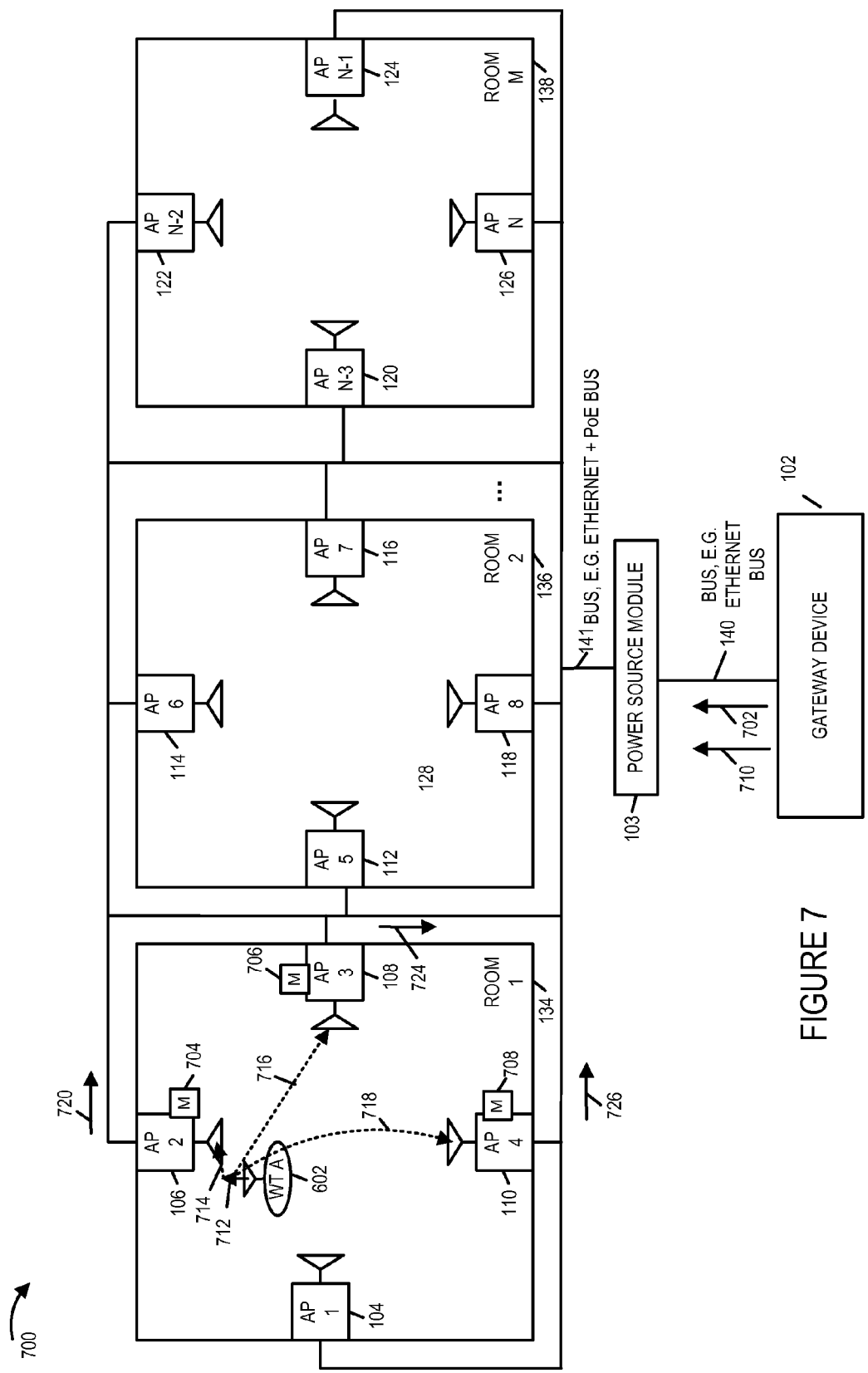
FIG. 7 illustrates a gateway device selecting and controlling a subset of access points, clustered in an area, to monitor for wireless terminal signals, in response to a detection during the monitoring of FIG. 6, in accordance with an exemplary embodiment.

The example continues with drawing 700 of FIG. 7. Gateway device 102 generates and transmits signal 702 to the APs (106, 108, 110), which controls the APs (106, 108, 110) to switch from a non-monitoring mode of operation to a monitoring mode of operation. The APs (106, 108, 110) receive signal 702 and switch into a monitoring mode of operation as indicated by block with "M" (704, 706, 708), respectively. Gateway device 102 generates and transmits signal 710 to APs (106, 108, 110) to control the APs (106, 108, 110) to monitor for wireless terminal signals during a second period of time in which AP 1 104 does not monitor for wireless terminal signals.

WT A 602 transmits signal 712 e.g., a discovery signal communicating device ID information or information used to derive device ID information, during the second period of time, which is detected by (AP 2 106, AP 3 108, AP 4 110), as indicated by dotted line arrows (714, 716, 718), respectively. AP 2 106 which has its wireless receiver powered on and its being controlled to monitor for signals from WTs, receives signal 712 as indicated by dotted line arrow 714. AP 2 106 measures the received power of the received signal, and recovers information being communicated in signal 712. AP 2 106, generates and transmits signal 720 to gateway device 102 communicating information indicating that AP 2 106 has detected a signal from a WT. In some embodiments, signal 720 further includes one or more of: information identifying WT A 602 as the device which transmitted the detected signal and the measured received signal strength at AP 2 106 of the received detected signal.

AP 3 108 which has its wireless receiver powered on and its being controlled to monitor for signals from WTs, also receives signal 712 as indicated by dotted line arrow 716. AP 3 108 measures the received power of the received signal, and recovers information being communicated in signal 712. AP 3 108, generates and transmits signal 724 to gateway device 102 communicating information indicating that AP 3 108 has detected a signal from a WT. In some embodiments, signal 724 further includes one or more of: information identifying WT A 602 as the device which transmitted the detected signal and the measured received signal strength at AP 3 108 of the received detected signal.

AP 4 110 which has its wireless receiver powered on and is being controlled to monitor for signals from WTs, also receives signal 712 as indicated by dotted line arrow 718. AP 4 110 measures the received power of the received signal, and recovers information being communicated in signal 712. AP 4 110, generates and transmits signal 726 to gateway device 102 communicating information indicating that AP 4 110 has detected a signal from a WT. In some embodiments, signal 726 further includes one or more of: information identifying WT A 602 as the device which transmitted the detected signal and the measured received signal strength at AP 4 110 of the received detected signal.

Gateway device 102 has been monitoring for signals from access points in the second subset indicating the detection of a signal from a wireless terminal Gateway device 102 receives signal (720, 724, 726) from APs (AP 2 104, AP 3 106, AP 4 108), respectively indicating that APs (AP 2 104, AP 3 106, AP 4 108) have detected a signal from WT A 602.

In various embodiments, gateway device 102 uses the information communicated in received signals (622, 720, 724, 726) to further manage and control the communications system, e.g., decide and/or control which AP or APs should be used as the point(s) of network attachment for WT A 602.

Figure 8:
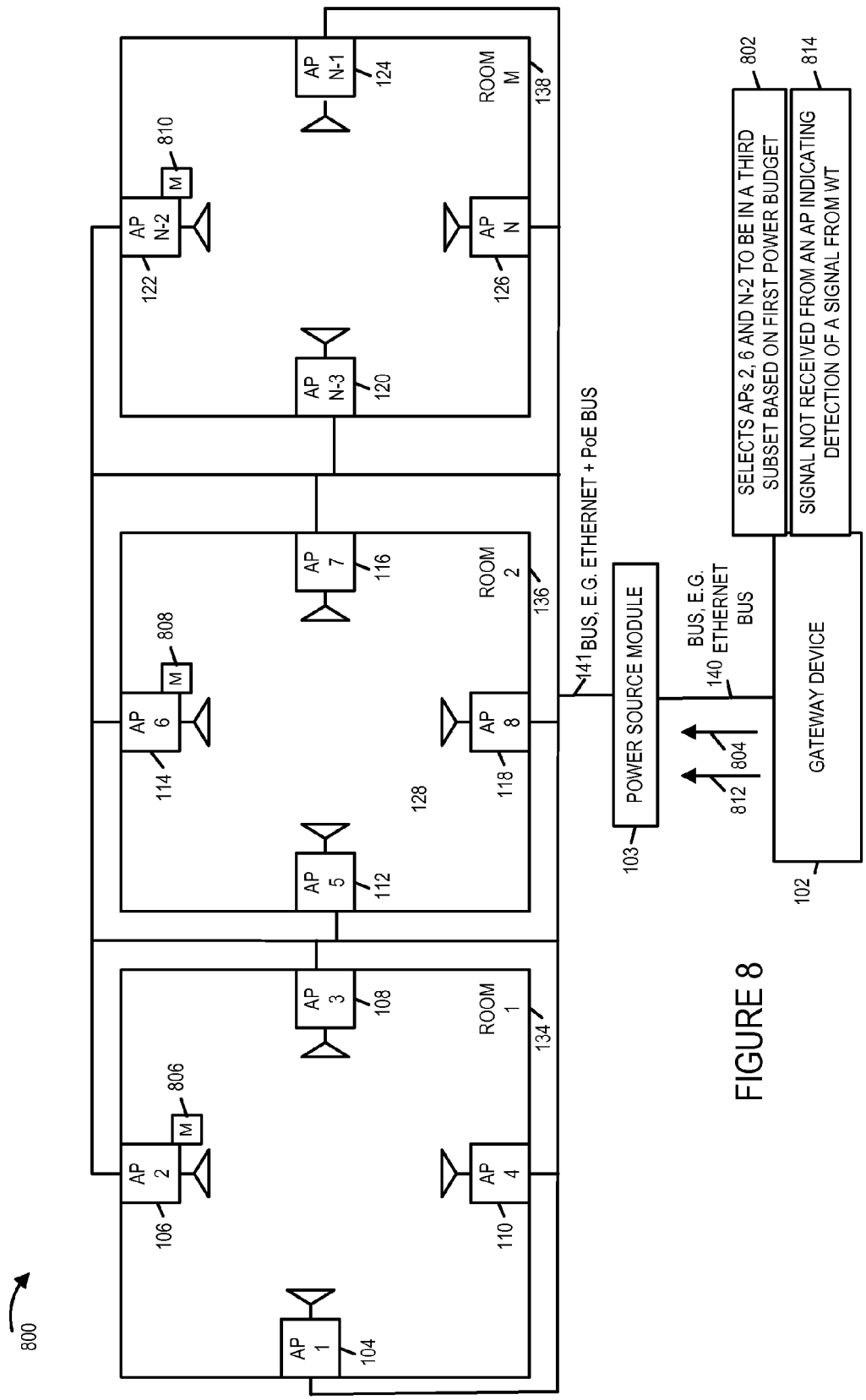
FIG. 8 illustrates a gateway device selecting and controlling another subset of access points distributed over a large area to monitor for wireless terminal signals in accordance with an exemplary embodiment.

The example continues with drawing 800 of FIG. 8. Gateway device 102 selects AP 2 106, AP 6 114, AP N−2 122 to be included in a third subset of access points based on the first common power source power budget, as indicated by block 802. The gateway device has intentionally selected the third subset of access points to be access points which are distributed over a large area to monitor for wireless terminal signals. Gateway device 102 generates and communicates signal 804 to the access points in the third subset (106, 114, 122) which notifies the access points (106, 114, 122) that they are to operate in a monitoring mode of operation during a third time period. APs (106, 114, 122) receive signal 804 and prepare to monitor for wireless terminal signals during the upcoming third period of time, as indicated by blocks with "M" (806, 808, 810), respectively. Gateway device 102 generates and transmits control signal 812 which controls the third subset of access points (106, 114, 122) to monitor for a signal from a wireless terminal during said third period of time.

During the third period of time, no WT signals are detected by the APs (106, 114, 122) which are monitoring for wireless terminal signals. Gateway device 102, which is monitoring for signals from APs (106, 114, 122) indicating that an access point has detected a WT signal, does not receive a signal indicating that an AP has detected a WT, as indicated by block 814. In response to the lack of signals indicating that an access point has detected a WT signal, the gateway device does not control any APs to monitor for WT signals during the upcoming fourth time interval.

Figure 9:
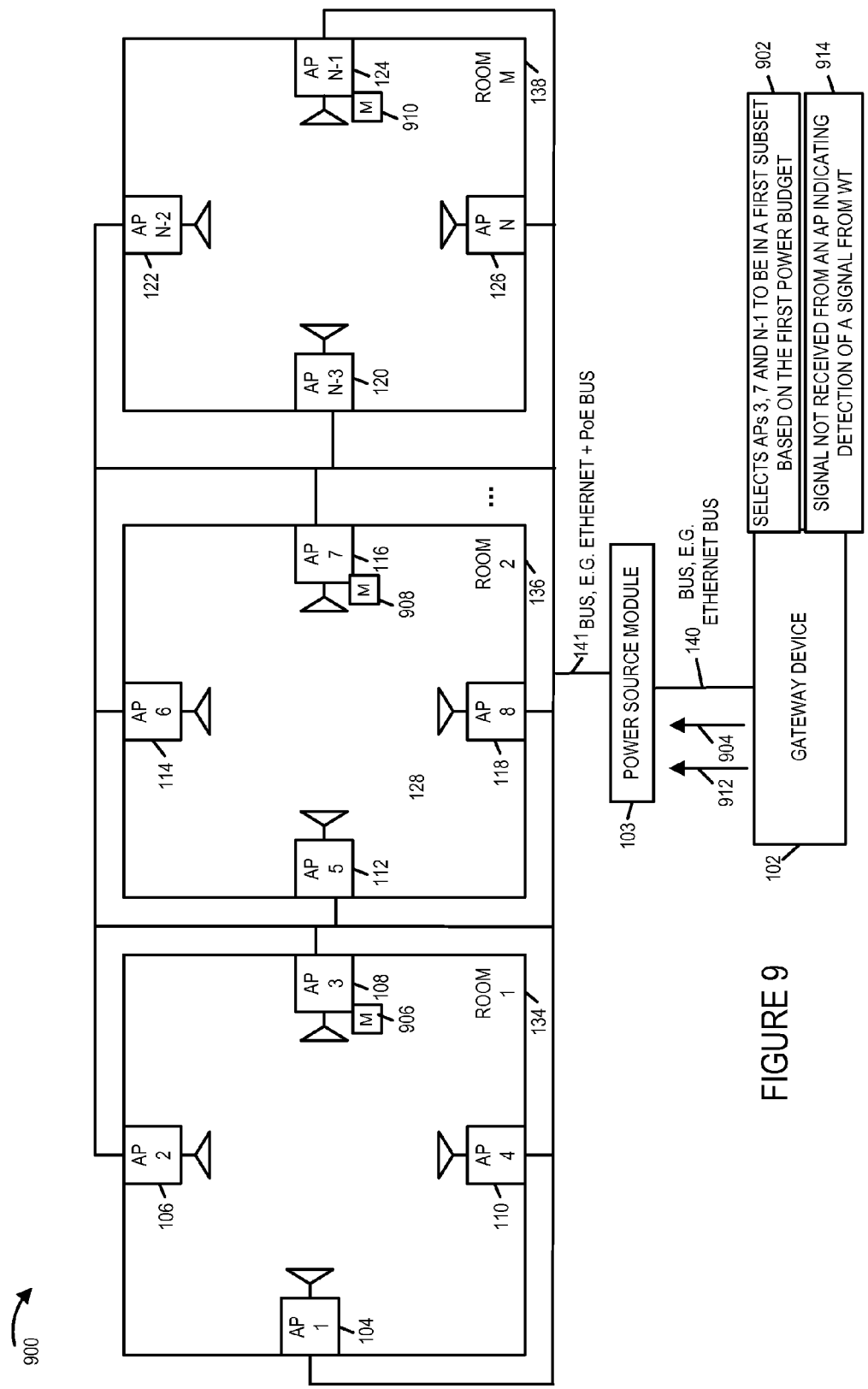
FIG. 9 illustrates a gateway device selecting and controlling yet another subset of access points distributed over a large area to monitor for wireless terminal signals in accordance with an exemplary embodiment.

The example continues with drawing 900 of FIG. 9. Gateway device 102 selects AP 3 108, AP 7 116, AP N−1 124 to be included in a first subset of access points based on the first common power source power budget, as indicated by block 902. The gateway device has intentionally selected the first subset of access points to be access points which are distributed over a large area to monitor for wireless terminal signals. Gateway device 102 generates and communicates signal 904 to the access points in the first subset (108, 116, 124) which notifies the access points (108, 116, 124) that they are to operate in a monitoring mode of operation during a first time period. APs (108, 116, 124) receive signal 904 and prepare to monitor for wireless terminal signals during the upcoming first period of time, as indicated by blocks with "M" (906, 908, 910), respectively. Gateway device 102 generates and transmits control signal 912 which controls the first subset of access points (108, 116, 124) to monitor for a signal from a wireless terminal during said first period of time.

During the first period of time, no WT signals are detected by the APs (108, 116, 124) which are monitoring for wireless terminal signals. Gateway device 102, which is monitoring for signals from APs (108, 116, 124) indicating that an access point has detected a WT signal, does not receive a signal indicating that an AP has detected a WT, as indicated by block 914. In response to the lack of signals indicating that an access point has detected a WT signal, the gateway device does not control any APs to monitor for WT signals during the upcoming second time interval.

Figure 10:
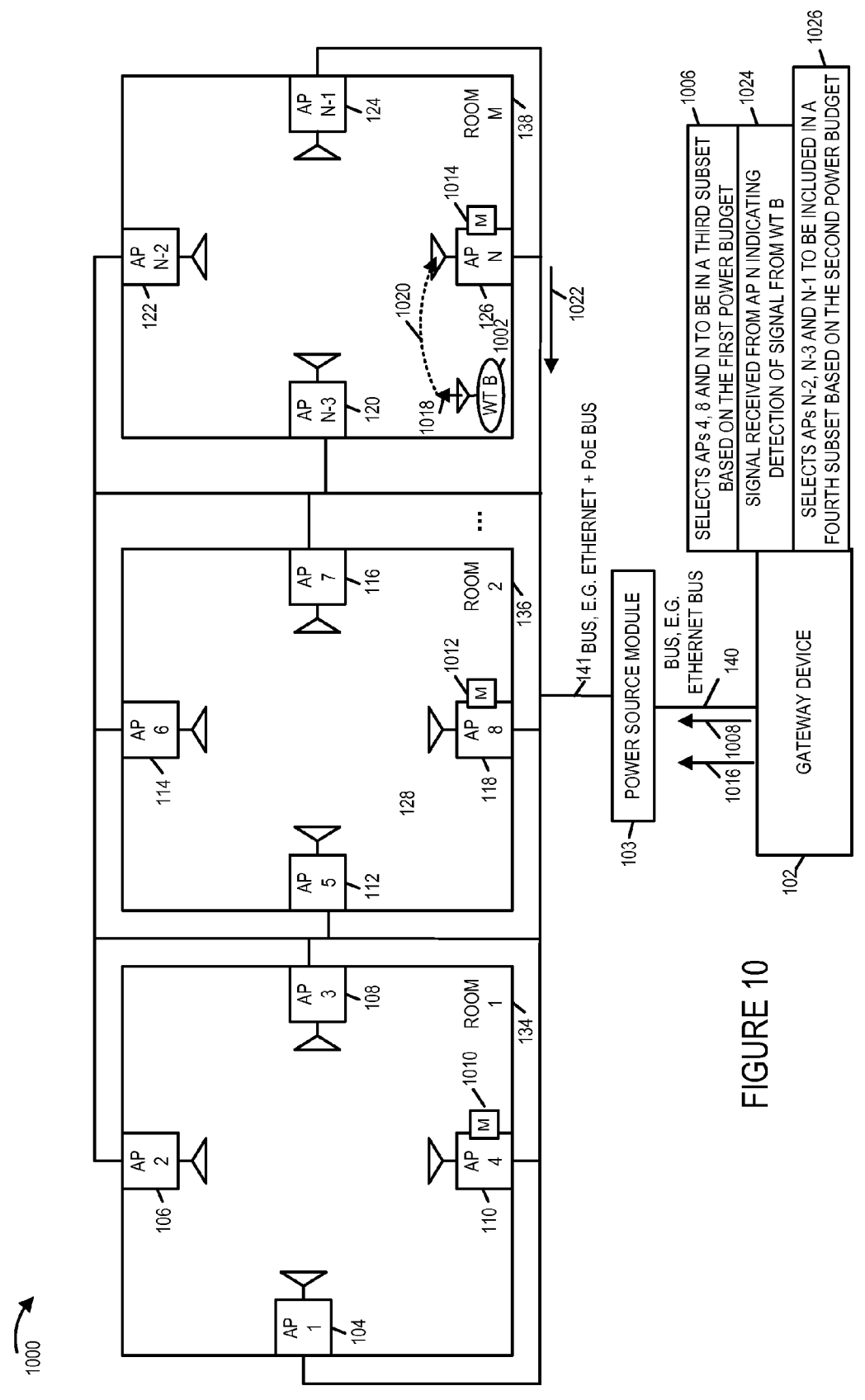

The example continues with drawing 1000 of FIG. 10. Gateway device 102 selects AP 4 110, AP 8 118, AP N 126 to be included in a third subset of access points based on a first common power source power budget, as indicated by block 1006. The gateway device has intentionally selected the third subset of access points to be access points which are distributed over a large area to monitor for wireless terminal signals. Gateway device 102 generates and communicates signal 1008 to the access points in the third subset (110, 118, 126) which notifies the access points (110, 118, 126) that they are to operate in a monitoring mode of operation during a third time period. APs (110, 118, 126) receive signal 1008 and prepare to monitor for wireless terminal signals during the upcoming third period of time, as indicated by blocks with "M" (1010, 1012, 1014), respectively. Gateway device 102 generates and transmits control signal 1016 which controls the third subset of access points (110, 118, 126) to monitor for a signal from a wireless terminal during said third period of time.

During the third period of time, WT B 1002 transmits signal 1018, e.g., a discovery signal communicating device ID information or information used to derive device ID information. AP N 126 which has its wireless receiver powered on and is being controlled to monitor for signals from WTs, receives signal 1018 as indicated by dotted line arrow 1020. AP N 126 measures the received power of the received signal, and recovers information being communicated in signal 1018. AP N 126, generates and transmits signal 1022 to gateway device 102 communicating information indicating that AP N 126 has detected a signal from a WT. In some embodiments, signal 1022 further includes one or more of: information identifying WT B 1002 as the device which transmitted the detected signal and the measured received signal strength at AP N 126 of the received detected signal.

Gateway device 102 has been monitoring for signals from access points in the first subset indicating the detection of a signal from a wireless terminal Gateway device 102 receives signal 1022 from AP N 126 indicating that AP N 126 detected a signal from WT B 1002, as indicated by block 1024.

In response to received signal 1022, the gateway device selects access points to be included in a fourth subset of access points based on a second common power source power budget. Gateway device 102 intentionally excludes AP N 126 for consideration for inclusion in the fourth subset since AP N 126 was included in the third subset. The gateway device 102 selects AP N-3 120, AP N-2 122 and AP N-1 124 for inclusion in the fourth subset of access points, as indicated by block 1026. APs (120, 122, 124) are a cluster of access points in close proximity to AP N 126, which were not included in the third subset of access points.

Figure 11:
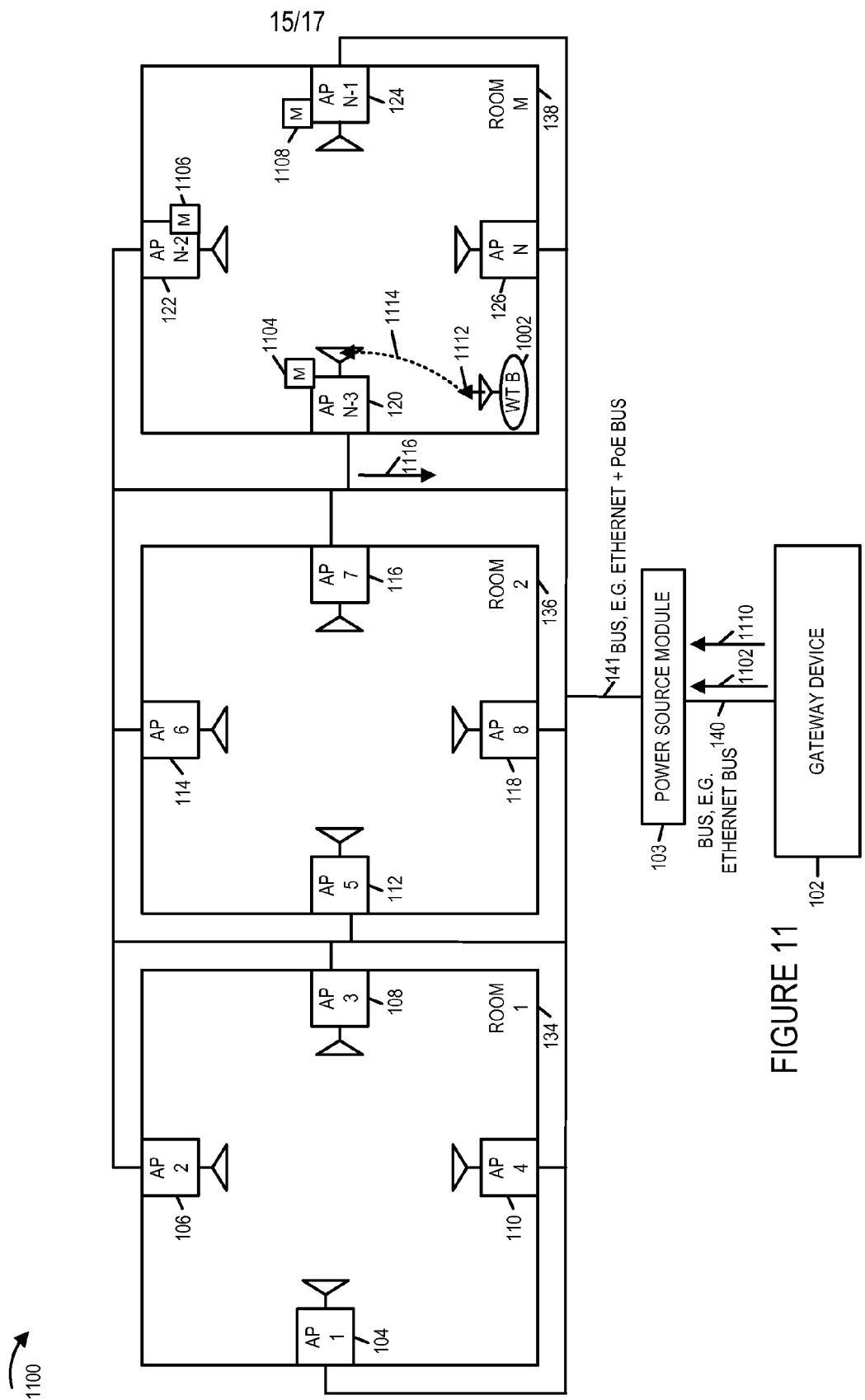
FIG. 11 illustrates a gateway device selecting and controlling a subset of access points, clustered in an area, to monitor for wireless terminal signals, in response to a detection during the monitoring of FIG. 10, in accordance with an exemplary embodiment.

The example continues with drawing 1100 of FIG. 11. Gateway device 102 generates and transmits signal 1102 to the APs (120, 122, 124), which controls the APs (120, 122, 124) to switch from a non-monitoring mode of operation to a monitoring mode of operation. The APs (120, 122, 124) receive signal 1102 and switch into a monitoring mode of operation as indicated by block with "M" (1104, 1106, 1108), respectively. Gateway device 102 generates and transmits signal 1110 to APs (120, 122, 124) to control the APs (120, 122, 124) to monitor for wireless terminal signals during a fourth period of time in which AP N 126 does not monitor for wireless terminal signals.

WT B 1002 transmits signal 1112 e.g., a discovery signal communicating device ID information or information used to derive device ID information, during the fourth period of time, which is detected by AP N-3 120 as indicated by dotted line arrow 1114. AP N-3 120 which has its wireless receiver powered on and is being controlled to monitor for signals from WTs, receives signal 1112 as indicated by dotted line arrow 1114. AP N-3 120 measures the received power of the received signal, and recovers information being communicated in signal 1112. AP N-3 120, generates and transmits signal 1116 to gateway device 102 communicating information indicating that AP N-3 120 has detected a signal from a WT. In some embodiments, signal 1116 further includes one or more of: information identifying WT B 1002 as the device which transmitted the detected signal and the measured received signal strength at AP N-3 120 of the received detected signal.

In various embodiments, gateway device 102 uses the information communicated in received signals (1022, 1116) to further manage and control the communications system, e.g., decide and/or control which AP or APs should be used as the point(s) of network attachment for WT B 1002.

In one embodiment corresponding to the example of FIGS. 6-11, the timing structure of FIG. 5 is used; AP 1 104, AP 5 112, and AP N-3 120 are controlled to monitor for WT signals during $1^{st}$ time interval 504; AP 2 106, AP 3 108, and AP 4 110 are controlled to monitor for WT signals during $2^{nd}$ time interval 506; AP 2 106, AP 6 114, and AP N-2 122 are controlled to monitor for WT signals during $3^{rd}$ time interval 508; no APs are controlled to monitor for WT signals during $4^{th}$ time interval 510; AP 3 108, AP 7 116, and AP N-1 124 are controlled to monitor for WT signals during $1^{st}$ time interval 504'; no APs are controlled to monitor for WT signals during $2^{nd}$ time interval 506'; AP 4 110, AP 8 118, and AP N 126 are controlled to monitor for WT signals during $3^{rd}$ time interval 508'; AP N-3 120, AP N-2 122 and AP N-1 124 are controlled to monitor for WT signals during $4^{th}$ time interval 510'.

Figure 12:
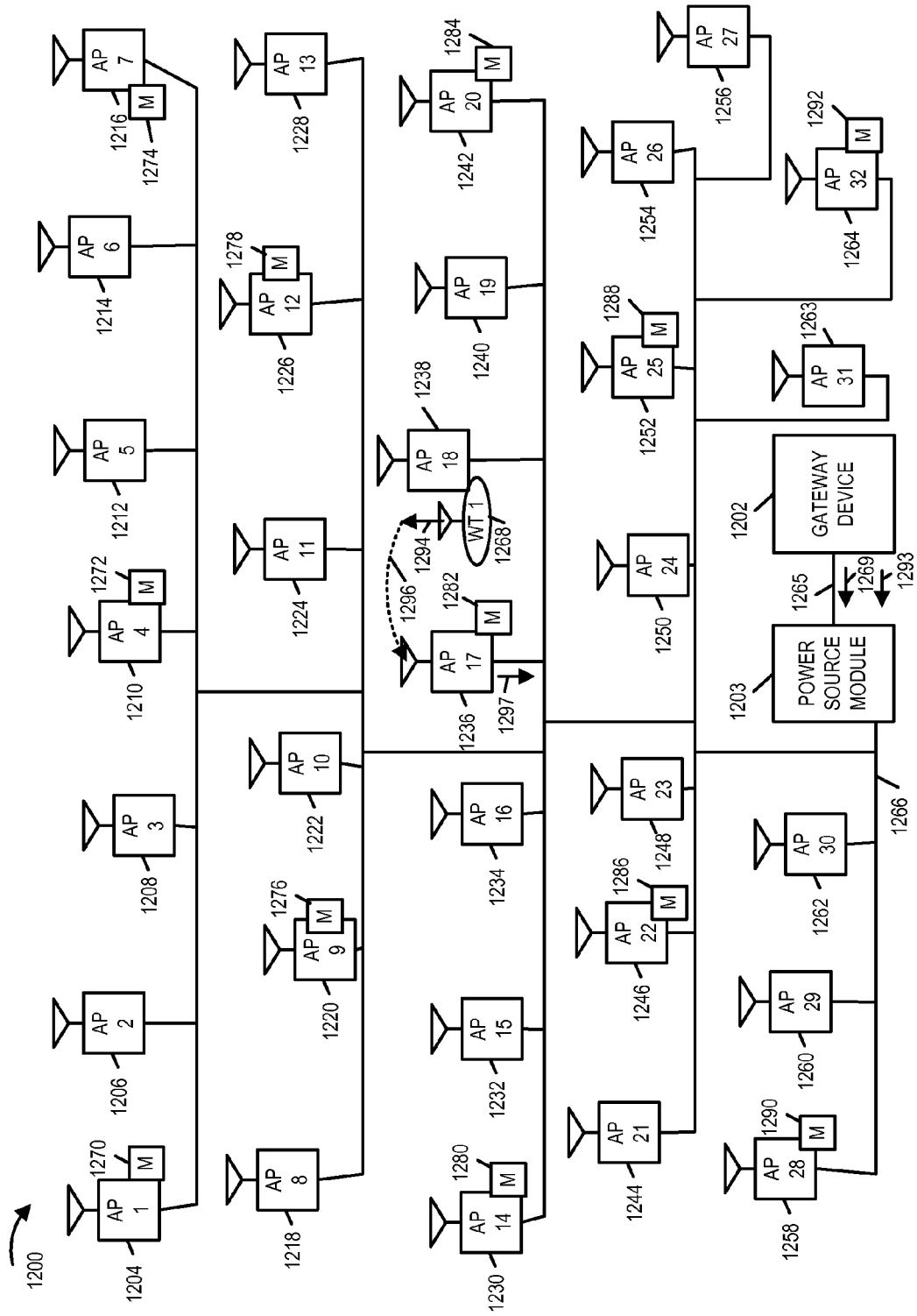
FIG. 12 illustrates a gateway device selecting and controlling a subset of access points distributed over a large area in a single room to monitor for wireless terminal signals in accordance with an exemplary embodiment.
Figure 13:
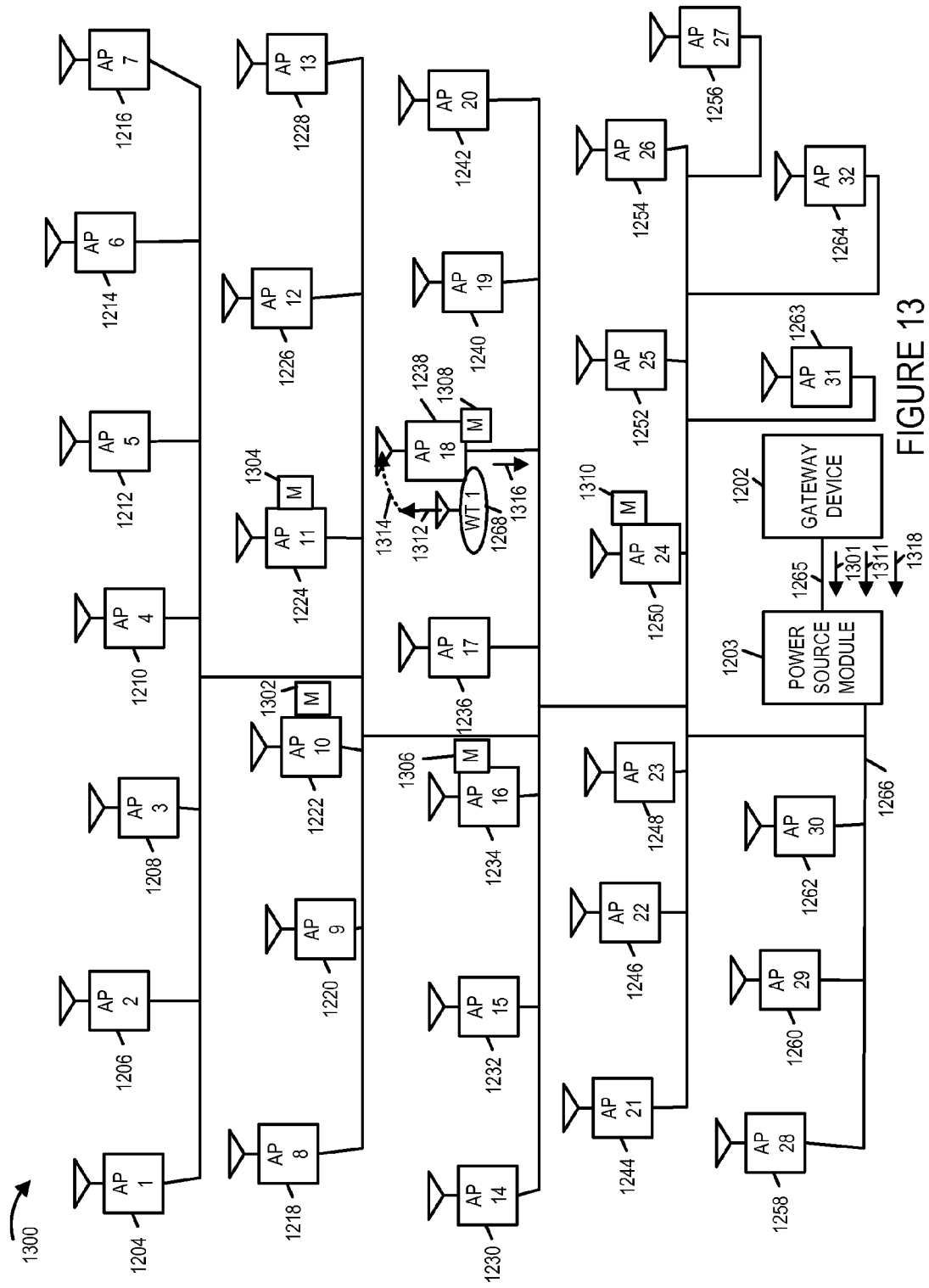
FIG. 13 illustrates a gateway device selecting and controlling a subset of access points, clustered in an area, to monitor for wireless terminal signals, in response to a detection during the monitoring of FIG. 12, in accordance with an exemplary embodiment.

FIGS. 12-13 illustrate an example in which a gateway device selects and controls subsets of access points to monitor for wireless terminals in accordance with an exemplary embodiment. FIG. 12 illustrates a drawing 1200 including the exemplary access points (AP 1 1204, AP 2 1206, AP 3 1208, AP 4 1210, AP 5 1212, AP 6 1214, AP 7 1216, AP 8 1218, AP 9 1220, AP 10 1222, AP 11 1224, AP 12 1226, AP 13 1228, AP 14 1230, AP 15 1232, AP 16 1234, AP 17 1236, AP 18 1238, AP 19 1240, AP 20 1242, AP 21 1244, AP 22 1246, AP 23 1248, AP 24 1250, AP 25 1252, AP 26 1254, AP 27 1256, AP 28 1258, AP 29 1260, AP 30 1262, AP 31 1263, AP 32 1264), an exemplary power source module 1203, and an exemplary gateway device 1202. The gateway device 1202 is coupled to power source module 1203 via bus 1265, e.g., an Ethernet bus. The power source module 1203 is coupled to the APs (AP 1 1204, AP 2 1206, AP 3 1208, AP 4 1210, AP 5 1212, AP 6 1214, AP 7 1216, AP 8 1218, AP 9 1220, AP 10 1222, AP 11 1224, AP 12 1226, AP 13 1228, AP 14 1230, AP 15 1232, AP 16 1234, AP 17 1236, AP 18 1238, AP 19 1240, AP 20 1242, AP 21 1244, AP 22 1246, AP 23 1248, AP 24 1250, AP 25 1252, AP 26 1254, AP 27 1256, AP 28 1258, AP 29 1260, AP 30 1262, AP 31 1263, AP 32 1264) via bus 1266, e.g., an Ethernet bus+PoE bus. The gateway device is, e.g., a gateway device in accordance with gateway device 102 of FIG. 1, a gateway device implementing a method in accordance with flowchart 200 of FIG. 2 and/or implemented in accordance with gateway device 300 of FIG. 3. The power source module 1203 is, e.g., a power source module in accordance with power source module 103 of FIG. 1. In one embodiment each of the access points are located in a single room.

The power source module 1202 includes a common power source which supplies power to the plurality of access points. Gateway device 1202 selects AP 1 1204, AP 4 1210, AP 7 1216, AP 9 1220, AP 12 1226, AP 14 1230, AP 17 1236, AP 20 1242, AP 22 1246, AP 25 1252, AP 28 1258, and AP 32 1264) to be included in a first subset of access points based on a first common power source power budget. The gateway device has intentionally selected the first subset of access points to be access points which are distributed over a large area to monitor for wireless terminal signals. In some embodiments, the selection of the first subset of access point in accordance with a predetermined selection schedule.

Gateway device 1202 generates and communicates a signal 1269 to the access points in the first subset (1204, 1210, 1216, 1220, 1226, 1230, 1236, 1242, 1246, 1252, 1258, 1264) which notifies the access points (1204, 1210, 1216, 1220, 1226, 1230, 1236, 1242, 1246, 1252, 1258, 1264) that they are to operate in a monitoring mode of operation during a first time period. APs (1204, 1210, 1216, 1220, 1226, 1230, 1236, 1242, 1246, 1252, 1258, 1264) receive the signal 1269 and prepare to monitor for wireless terminal signals during the upcoming first period of time, as indicated by blocks with "M" (1270, 1272, 1274, 1276, 1278, 1280, 1282, 1284, 1286, 1288, 1290, 1292), respectively. Gateway device 1202 generates and transmits a control signal 1293 which controls the first subset of access points (1204, 1210, 1216, 1220, 1226, 1230, 1236, 1242, 1246, 1252, 1258, 1264) to monitor for a signal from a wireless terminal during said first period of time.

During the first period of time, WT 1 1268 transmits signal 1294, e.g., a discovery signal communicating device ID information or information used to derive device ID information. AP 17 1236 which has its wireless receiver powered on and its being controlled to monitor for signals from WTs, receives signal 1294 as indicated by dotted line arrow 1296. AP 17 1236 measures the received power of the received signal, and recovers information being communicated in signal 1294. AP 17 1236, generates and transmits a signal 1297 to gateway device 1202 communicating information indicating that AP 17 1236 has detected a signal from a WT. In some embodiments, the communicated signal 1297 further includes one or more of: information identifying WT 1 1268 as the device which transmitted the detected signal and the measured received signal strength at AP 17 1236 of the received detected signal from the WT.

Gateway device 1202 has been monitoring for signals from access points in the first subset of access points indicating the detection of a signal from a wireless terminal Gateway device 1202 receives signal 1297 from AP 17 1236 indicating that AP 17 1236 detected a signal from WT 1 1268.

In response to received signal 1297, the gateway device selects access points to be included in a second subset of access points based on a second common power source power budget. Gateway device 1202 intentionally excludes AP 17 1236 for consideration for inclusion in the second subset since AP 17 1236 was included in the first subset. The gateway device 1202 selects AP 10 1222, AP 11 1224, AP 16 1234, AP 18 1238 and AP 24 1250 for inclusion in the second subset of access points. APs (AP 10 1222, AP 11 1224, AP 16 1234, AP 18 1238 and AP 24 1250) are a cluster of access points in close proximity to AP 17 1236, which were not included in the first subset of access points.

The example continues with drawing 1300 of FIG. 13. Gateway device 1202 generates and transmits signal 1301 to the APs (AP 10 1222, AP 11 1224, AP 16 1234, AP 18 1238 and AP 24 1250), which controls the APs (AP 10 1222, AP 11 1224, AP 16 1234, AP 18 1238 and AP 24 1250) to switch from a non-monitoring mode of operation to a monitoring mode of operation. The APs (AP 10 1222, AP 11 1224, AP 16 1234, AP 18 1238 and AP 24 1250) receive signal 1301 and switch into a monitoring mode of operation as indicated by block with "M" (1302, 1304, 1306, 1308, 1310), respectively. Gateway device 1202 generates and transmits signal 1311 to APs (AP 10 1222, AP 11 1224, AP 16 1234, AP 18 1238 and AP 24 1250) to control the APs (AP 10 1222, AP 11 1224, AP 16 1234, AP 18 1238 and AP 24 1250) to monitor for wireless terminal signals during a second period of time in which AP 17 1236 does not monitor for wireless terminal signals.

WT 1 1268 transmits signal 1312 e.g., a discovery signal communicating device ID information or information used to derive device ID information, during the second period of time. AP 18 1238 which has its wireless receiver powered on and its being controlled to monitor for signals from WTs, receives signal 1312 as indicated by dotted line arrow 1314. AP 18 1238 measures the received power of the received signal, and recovers information being communicated in signal 1312. AP 18 1238, generates and transmits signal 1316 to gateway device 1202 communicating information indicating that AP 18 1238 has detected a signal from a WT. In some embodiments, signal 1238 further includes one or more of: information identifying WT 1 1268 as the device which transmitted the detected signal and the measured received signal strength at AP 18 1238 of the received detected signal.

Gateway device 1202 has been monitoring for signals from access points in the second subset of access points indicating the detection of a signal from a wireless terminal Gateway device 1202 receives signal 1316 from AP 18 1238 indicating that AP 18 1238 detected a signal from WT 1 1268.

Gateway device 1202 uses the information communicated in received signals (1297, 1316) to further manage and control the communications system, e.g., decide and/or control which AP or APs should be used as the point(s) of network attachment for WT 1 1268. Gateway device 1202 decides that AP 18 1238 is to be the point of network attachment for WT 1 1268, generates signal 1318 communicating its decision and transmits signal 1318 to AP 18 1238 to control AP 18 to serve as the point of network attachment for WT 1 1268.

In this example, the first common power source power budget for allocating APs to monitor during the first time interval is different than the second common power source power budget for allocating APs to monitor during the second time interval such that 12 APs are controlled to monitor during the first time interval and 5 APs are controlled to monitor during the second time interval. Power not allocated to controlling WTs to monitor can be, and sometimes is, used for other purposes, e.g., to allow APs to transmit signals, e.g., in accordance with other common power source power budgets. In various embodiments during first time intervals APs which are not controlled to monitor for WT signals during the first time interval have their wireless receiver powered down. In various embodiments during first time intervals APs which are not controlled to monitor for WT signals during the first time interval have at least some of the circuitry in their wireless receiver powered down. In various embodiments during second time intervals APs which are not controlled to monitor for WT signals during the second time interval have their wireless receiver powered down. In various embodiments during second time intervals APs which are not controlled to monitor for WT signals during the second time interval have at least some of the circuitry in their wireless receiver powered down.

Various aspects and/or features of some, but not necessarily all, embodiments are discussed below. Power efficient methods and apparatus for detecting wireless terminals and determining which of a plurality of access points in a relatively small geographic area, e.g., room, should serve as a wireless terminal's point of network connectivity are described. In various embodiments wireless terminals transmit discovery signals and/or other signals which may be detected by an access point. Various described methods and apparatus are particularly well suited for embodiments where multiple access points obtain power from a common power source. In some embodiments, the power delivery capabilities from the common power source to the APs is limited by one or more or all of: the maximum power output of the common power source, the current carrying capabilities of the wires delivering the power to the APs, e.g., wire gage limitations, the length of the wires delivering power to the APs, and the topology. The number of access points in a given area, e.g., room or group of rooms, may and in some embodiments does, exceed the number of access points which can be fully powered concurrently by the common power source due to the power delivery capabilities of the network. The number of access points in a given area, e.g., room or group of rooms, may and in some embodiments does, exceed the number of access points which can be powered concurrently to monitor to receive wireless signals by the common power source due to the power delivery capabilities of the network. Wireless terminals and the access points may use communications signals, e.g., blue tooth and/or other signals which are normally used for relatively short range communications and which may be subject to interference or blocking, e.g., due to an object in a room or an individual moving into a particular location in a room. While a room or group of rooms may have multiple Ethernet ports, e.g., each powering an access point, the common power bus of the Ethernet+PoE may not, and in some embodiments cannot, support powering all the access points coupled to it at the same time with enough power to allow then to monitor and/or receive signals at the same time.

To address power constraints, the access points are controlled by a gateway device coupled to the access points so that one or more access points perform monitoring at different times with one or more access points having their receivers powered off while another access point monitors for wireless terminal signals and, at least in some embodiments, also refrains from transmitting. Thus, power consumption from the common power source is controlled by controlling power consumption associated with monitoring operations performed by one or more access points coupled to the common power source.

Through the control of the number of access points performing monitoring operations at a given time, power consumption from the common power source is managed allowing the number of access points in an area to be higher than the number which could be supported due to limited power constraints if all the access points, which are powered by the common power source, monitored for wireless terminals at the same time.

In some embodiments, the gateway device determines an access point monitoring schedule to constrain the amount of power drawn from a common power source by access points being controlled by the gateway, e.g., for monitoring purposes, to a predetermined amount thereby avoiding an excessive demand on the common power source at any given time. In some embodiments, the access points in an area have their receivers powered on sequentially accordingly to a schedule, e.g., a schedule determined by the gateway device to which the access points in an area are coupled. The schedule is used to control monitoring for wireless terminals. The schedule may be a simple sequential schedule in which access points sequentially monitor for wireless terminals, e.g., in an order based on their access point IDs or some other order, or in groups determined by the gateway device. For example, in some embodiments the gateway device may schedule multiple access points in close proximity to monitor at the same time so that they will have a chance of detecting the same signals from wireless terminals. Alternatively, the gateway may schedule access points in different areas to monitor at the same time thereby allowing a wide area to be initially monitored and wireless terminals to be detected quickly. In some embodiments the gateway device controls the access points which perform monitoring to ones which are geographically dispersed to having multiple access points in a local area or region in which a wireless terminal was detected to monitor at the same time. It should be appreciated that due to power constraints the number of access points which can monitor at a particular point in time may be relatively constant but by switching under control of the gateway device between relatively sparse monitoring of a wide area to concentrated monitoring of areas in which a wireless terminal has been detected, power available for monitoring can be used efficiently while still allowing for rapid collection and assessment of information allowing for a reliable determination of which of a plurality of possible access points should be powered on and serve a wireless terminal at any point in time.

In response to detection of a wireless terminal, a detecting access point measures the strength of the received signal and/or detects a device identifier. The access point then reports the signal strength and/or detected device identifier to the gateway device acting as a controller in the system.

In response to receiving an indication that a wireless terminal has been detected by an access point, the gateway device can, and in some embodiments does, signal one or a group of nearby access points to perform a monitoring operation. In some embodiments, for power conservation purposes, the access point which detected the wireless terminal refrains from monitoring during the monitoring triggered by the detection and reporting of the presence of a wireless terminal, e.g., triggered by the detection during the sparse wide area monitoring period of time.

Thus, the gateway device may, and in some embodiments does, alter or add one or more monitoring periods to a schedule used to control access point monitoring. The added monitoring period or periods implemented by an access point may be in response to an instruction to perform monitoring at a point in time specified by the gateway device.

In addition to controlling when access points perform monitoring, the gateway device also controls which access point or points serve, at any given time, as a wireless terminal's point of network connectivity. An access point severing as a wireless terminal's point of network connectivity transmits traffic data to, and receives traffic data from, the wireless terminal which it is serving. Since the gateway controls not only when and by which access points monitoring will be performed but also when and which access points will be serving wireless terminals, the gateway can control the power consumption on a common power source by scheduling monitoring and by scheduling which access points will be serving as wireless terminal's point of network access during a given time period.

Since access points which are not operating as a wireless terminal's network point of attachment will occasionally, e.g., periodically or according to a schedule, perform monitoring, the gateway device will be able to detect changes in channel conditions and re-assigned wireless terminals to different access points as may be appropriate. In addition, the monitoring, while not performed on a continuous basis, is sufficient for the system and gateway to detect changes in wireless terminal location and/or detect the presence of new wireless terminals, allowing wireless terminals to be serviced in a power efficient and dynamic manner.

The methods and apparatus of the present invention are particularly well suited for systems where a common power source and/or a common power bus supplies power to access points, and the amount of power which can be supplied from the common power source is limited, e.g., to a fixed predetermined amount. Numerous embodiments are contemplated. In at least some embodiments multiple access points in a room or group of rooms are powered from a common power source, e.g., via a common bus with limited power delivery capability. Overlapping access point coverage areas may be supported. In at least some, but not necessarily all, such embodiments a single access point or less than all access points monitor a portion of the area, subject to overlapping coverage at a given point in time, e.g., when the presence of a wireless terminal has not been detected in the area.

Although described primarily in the context of system using Ethernet+PoE, the methods and apparatus of the present invention are also applicable to various other structures in which a plurality of access points obtain power from a common power source, e.g., systems including one or more of all of the following: a powerline control interface, power line control signaling, a powerline control breaker panel, end span power sources, end span power switches, Ethernet switches, and mid span power sources.

Numerous variations on the above described methods and apparatus are possible.

In various embodiments a device, e.g., a gateway device in system 100 of FIG. 1, and/or gateway device 300 of FIG. 3, and/or a gateway device of any of the Figures includes a module corresponding to each of the individual steps and/or operations described with regard to any of the Figures in the present application and/or described in the detailed description of the present application. In some embodiments, the modules are implemented in hardware, e.g., in the form of circuits. Thus, in at least some embodiments the modules may, and sometimes are implemented in hardware. In other embodiments, the modules may, and sometimes are, implemented as software modules including processor executable instructions which when executed by the processor of the communications device cause the device to implement the corresponding step or operation. In still other embodiments, some or all of the modules are implemented as a combination of hardware and software.

The techniques of various embodiments may be implemented using software, hardware and/or a combination of software and hardware. Various embodiments are directed to apparatus, e.g., gateway devices, wireless terminals such as mobile or stationary nodes, access points such as base stations, other communications devices, network nodes, and/or communications systems. Various embodiments are also directed to methods, e.g., method of controlling and/or operating, gateway devices, mobile nodes, stationary nodes, access points such as base stations, network nodes, and/or communications systems, e.g., hosts. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

In various embodiments nodes described herein are implemented using one or more modules to perform the steps corresponding to one or more methods, for example, signal processing, signal generation and/or transmission steps. Thus, in some embodiments various features are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to a device, e.g., communications node, including a processor configured to implement one, multiple or all of the steps of one or more methods of the invention.

In some embodiments, the processor or processors, e.g., CPUs, of one or more devices, e.g., gateway devices, communications nodes such as wireless terminals, access nodes and/or network nodes, are configured to perform the steps of the methods described as being performed by the device. The configuration of the processor may be achieved by using one or more modules, e.g., software modules, to control processor configuration and/or by including hardware in the processor, e.g., hardware modules, to perform the recited steps and/or control processor configuration. Accordingly, some but not all embodiments are directed to a device, e.g., a gateway device, with a processor which includes a module corresponding to each of the steps of the various described methods performed by the device in which the processor is included. In some but not all embodiments a device, e.g., a gateway device, includes a module corresponding to each of the steps of the various described methods performed by the device in which the processor is included. The modules may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a communications device or node. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device or other device described in the present application.

Various embodiments are well suited to communications systems in which a plurality of access points are powered via a bus, e.g., an Ethernet bus, and/or controlled by a device, e.g., a gateway device. Various embodiments, are well suited for applications in which the power delivery capability of the bus is insufficient for simultaneous operation of each of the access points connected to the bus in one or more particular modes of operation, e.g., all of the access points connected to the bus cannot be operated simultaneous to monitor for signals from wireless terminals. Some embodiments use an Orthogonal Frequency Division Multiplexing (OFDM) based wireless signaling protocol, e.g., WiFi signaling protocol or another OFDM based protocol for signaling between access points and wireless terminals in the communications system.

While described in the context of an OFDM system, at least some of the methods and apparatus of various embodiments are applicable to a wide range of communications systems including many non-OFDM and/or non-cellular systems.

Numerous additional variations on the methods and apparatus of the various embodiments described above will be apparent to those skilled in the art in view of the above description. Such variations are to be considered within the scope. The methods and apparatus may be, and in various embodiments are, used with Code Division Multiple Access (CDMA), OFDM, and/or various other types of communications techniques which may be used to provide wireless communications links between communications devices. In some embodiments one or more communications devices are implemented as access points which establish communications links with mobile nodes using OFDM and/or CDMA and/or may provide connectivity to the internet or another network via a wired or wireless communications link. In various embodiments the mobile nodes are implemented as notebook computers, personal data assistants (PDAs), or other portable devices including receiver/transmitter circuits and logic and/or routines, for implementing the methods.

What is claimed is:

1. A method of operating a gateway device, the method comprising:
controlling a first subset of access points, in a plurality of access points, which obtain power from a common power source, to monitor for a signal from a wireless terminal during a first period of time during which at least some access points in said plurality of access points do not monitor for wireless terminal signals, said first subset of access points including one or more access points, said first subset of access points including a first access point;
receiving a signal from said first access point indicating detection of a signal from a wireless terminal;
controlling, in response to receiving said signal indicating detection of a wireless terminal, at least a second access point in said plurality of access points to switch from a non-monitoring mode of operation to a monitoring mode of operation; and
controlling at least the second access point to monitor for wireless terminal signals during a second period of time while said first access point does not monitor for wireless terminal signals.

2. The method of claim 1, further comprising:
selecting access points in said plurality of access points to be included in said first subset of access points based on a first common power source power budget; and
communicating to access points in said first subset of access points that they are to operate in a monitoring mode of operation during said first period of time.

3. The method of claim 2,
wherein selecting access points to be included in said first subset of access points includes selecting a first plurality of access points distributed over a large area to monitor for wireless terminal signals.

4. The method of claim 3, further comprising:
selecting access points in said plurality of access points to be included in a second subset of access points based on a second common power source power budget, and wherein said selecting access points to be included in a second subset of access points includes excluding from consideration for possible selection said first access point.

5. The method of claim 4, wherein said selecting access points to be included in a second subset of access points includes basing the selection of the second subset of access points on the location of said first access point.

6. The method of claim 5, wherein said selecting access points to be included in a second subset of access points includes applying a preference for selecting access points for inclusion in said second subset of access points which were not included in said first subset of access points.

7. The method of claim 5, wherein said selecting access points to be included in a second subset of access points includes selecting a cluster of access points in proximity to said first access point.

8. The method of claim 2, further comprising:
selecting access points from said plurality of access points to be included in a third subset of access points based on said first common power source power budget; and
communicating to access points in said third subset of access points that they are to operate in a monitoring mode of operation during a third period of time.

9. A gateway device comprising:
means for controlling a first subset of access points, in a plurality of access points, which obtain power from a common power source, to monitor for a signal from a wireless terminal during a first period of time during which at least some access points in said plurality of access points do not monitor for wireless terminal signals, said first subset of access points including one or more access points, said first subset of access points including a first access point;
means for receiving a signal from said first access point indicating detection of a signal from a wireless terminal;
means for controlling, in response to receiving said signal indicating detection of a wireless terminal, at least a second access point in said plurality of access points to switch from a non-monitoring mode of operation to a monitoring mode of operation; and
means for controlling at least the second access point to monitor for wireless terminal signals during a second period of time while said first access point does not monitor for wireless terminal signals.

10. The gateway device of claim 9, further comprising:
means for selecting access points in said plurality of access points to be included in said first subset of access points based on a first common power source power budget; and
means for communicating to access points in said first subset of access points that they are to operate in a monitoring mode of operation during said first period of time.

11. The gateway device of claim 10,
wherein said means for selecting access points to be included in said first subset of access points includes means for selecting a first plurality of access points distributed over a large area to monitor for wireless terminal signals.

12. The gateway device of claim 11, further comprising:
means for selecting access points in said plurality of access points to be included in a second subset of access points based on a second common power source power budget, and wherein said means for selecting access points to be included in a second subset of access points includes means for excluding from consideration for possible selection said first access point.

13. The gateway device of claim 12, wherein said means for selecting access points to be included in a second subset of access points includes means for basing the selection of the second subset of access points on the location of said first access point.

14. The gateway device of claim 13, wherein said means for selecting access points to be included in a second subset of access points includes means for applying a preference for selecting access points for inclusion in said second subset of access points which were not included in said first subset of access points.

15. A computer program product for use in a gateway device, the computer program product comprising:
a non-transitory computer readable medium comprising:
code for causing at least one computer to control a first subset of access points, in a plurality of access points, which obtain power from a common power source, to monitor for a signal from a wireless terminal during a first period of time during which at least some access points in said plurality of access points do not monitor for wireless terminal signals, said first subset of access points including one or more access points, said first subset of access points including a first access point;
code for causing said at least one computer to receive a signal from said first access point indicating detection of a signal from a wireless terminal;
code for causing said at least one computer to control, in response to receiving said signal indicating detection of a wireless terminal, at least a second access point in said plurality of access points to switch from a non-monitoring mode of operation to a monitoring mode of operation; and
code for causing said at least one computer to control at least the second access point to monitor for wireless terminal signals during a second period of time while said first access point does not monitor for wireless terminal signals.

16. A gateway device comprising:
at least one processor configured to:
control a first subset of access points, in a plurality of access points, which obtain power from a common power source, to monitor for a signal from a wireless terminal during a first period of time during which at least some access points in said plurality of access points do not monitor for wireless terminal signals, said first subset of access points including one or more access points, said first subset of access points including a first access point;
receive a signal from said first access point indicating detection of a signal from a wireless terminal;
control, in response to receiving said signal indicating detection of a wireless terminal, at least a second access point in said plurality of access points to switch from a non-monitoring mode of operation to a monitoring mode of operation; and
control at least the second access point to monitor for wireless terminal signals during a second period of time while said first access point does not monitor for wireless terminal signals; and
memory coupled to said at least one processor.

17. The gateway device of claim 16, wherein said at least one processor is further configured to:
select access points in said plurality of access points to be included in said first subset of access points based on a first common power source power budget; and
communicate to access points in said first subset of access points that they are to operate in a monitoring mode of operation during said first period of time.

18. The gateway device of claim 17, wherein said at least one processor is configured to select a first plurality of access points distributed over a large area to monitor for wireless terminal signals, as part of being configured to selecting access points to be included in said first subset of access points.

19. The gateway device of claim 18,
wherein said at least one processor is further configured to:
select access points in said plurality of access points to be included in a second subset of access points based on a second common power source power budget, and
wherein said at least one processor is configured to exclude from consideration for possible selection said first access point, as part of being configured to select access points to be included in a second subset of access points.

20. The gateway device of claim 19, wherein said at least one processor is configured to base the selection of the second subset of access points on the location of said first access point, as part of being configured to select access points to be included in a second subset of access points.

* * * * *